United States Patent
Gilhousen

Patent Number: 5,970,413
Date of Patent: Oct. 19, 1999

[54] USING A FREQUENCY THAT IS UNAVAILABLE FOR CARRYING TELEPHONE VOICE INFORMATION TRAFFIC FOR DETERMINING THE POSITION OF A MOBILE SUBSCRIBER IN A CDMA CELLULAR TELEPHONE SYSTEM

[75] Inventor: Klein S. Gilhousen, Bozeman, Mont.

[73] Assignee: Qualcomm Incorporated, San Diego, Calif.

[21] Appl. No.: 08/659,504

[22] Filed: Jun. 6, 1996

[51] Int. Cl.⁶ ........................................ H04Q 7/20
[52] U.S. Cl. .................. 455/456; 455/457; 455/550
[58] Field of Search ................... 455/56.1, 67.4, 455/67.1, 456, 404, 512; 342/450, 457

[56] References Cited

U.S. PATENT DOCUMENTS

| | | | |
|---|---|---|---|
| 5,046,130 | 9/1991 | Hall et al. | 455/78 |
| 5,280,629 | 1/1994 | Lo Galbo et al. | 455/67.4 |
| 5,423,067 | 6/1995 | Manabe | 455/56.1 |
| 5,600,706 | 2/1997 | Dunn et al. | 455/56.1 |
| 5,732,354 | 3/1998 | MacDolnd | 455/456 |
| 5,844,522 | 10/1995 | Sheffer et al. | 455/32.1 |

*Primary Examiner*—Wellington Chin
*Assistant Examiner*—Tilahun Gesesse
*Attorney, Agent, or Firm*—Russell B. Miller; Bruce W. Greenhaus

[57] ABSTRACT

A method for determining the position of a mobile station within a cellular telephone system having a plurality of cells. Voice information signals are transmitted between a first base station transmitter and a mobile station on a transmission channel. Thereafter, transmissions from the first base station transmitter of voice information signals on the transmission channel are ceased for a predetermined period of time. During the predetermined period of time when transmissions of voice information signals from the first base station transmitter have ceased on the transmission channel, the mobile station makes positional measurements. The position of the mobile station is determined in accordance with the positional measurements.

22 Claims, 15 Drawing Sheets

USING A FREQUENCY THAT IS UNAVAILABLE FOR CARRYING TELEPHONE VOICE INFORMATION TRAFFIC FOR DETERMINING THE POSITION OF A MOBILE SUBSCRIBER IN A CDMA CELLULAR TELEPHONE SYSTEM

FIELD OF THE INVENTION

The present invention relates generally to cellular telephone systems. More specifically, the present invention relates to systems and methods for determining the geographical position of a mobile subscriber within a cellular telephone system. Still more particularly, the present invention relates to a method for locating a mobile subscriber within a code division multiple access (CDMA) cellular telephone system.

BACKGROUND OF THE INVENTION

There are several desirable reasons for having a service that can determine the position of a mobile radio operating within a cellular telephone system. For example, such a positioning service could be used for locating emergency callers (911) or children positioned within a cellular system. Alternatively, such a positioning service could be used for locating vehicles as part of a dispatching or fleet monitoring system. Also, cellular system operators could use such a positioning service in order to customize service parameters based on an accurate knowledge of mobile telephone location. Such customization could include, for example, providing lower cost services for limited mobility customers. A positioning service would also be of use in locating stolen cellular phones and for investigating fraudulent use of cellular services.

Methods for radio position determination make use of techniques for measuring the propagation delay of a radio signal, which is assumed to travel in a straight line from a transmitter to a receiver at the speed of light. A radio delay measurement in combination with an angle measurement provided by a directive antenna is the fundamental principle of radar location. Radar location is frequently augmented by use of a transponder in the mobile vehicle, rather than relying entirely on the signal reflected by the mobile vehicle.

Alternatively, a so-called trilateration system may be used for locating a mobile radio. In a trilateration system, multiple time delay measurements are made using multiple transmitters and/or receivers. The Loran system is an example of a location system which transmits a series of coded pulses from base stations at known and fixed locations to a mobile receiver. The mobile receiver compares the times of arrival of signals from the different transmitters to determine hyperbolic lines of positions. Similarly, the Global Positioning System (GPS) provides transmission from a set of 24 earth orbiting satellites. Mobile receivers can determine their position by using knowledge of the satellites' locations and the time delay differences between signals received from four or more satellites.

From the above examples, it can be seen that radio position location systems can be divided into two types, those which allow a mobile user to determine its own position, such as GPS, and those which allow another party to determine the position of a mobile transponder such as radar systems. The system disclosed in the present application includes elements of both types, but primarily of the second type, where the fixed portion of a radio system wishes to determine the location of a mobile radio unit positioned within the system. Except in the case of passive radar, such systems generally require the mobile radio unit to transmit a radio signal.

U.S. Pat. No. 5,126,748, entitled "Dual Satellite Navigation Method and System," discloses a method of radio location where the mobile terminal both transmits and receives signals, thereby allowing round trip timing measurements defining circular lines of position to be performed using fewer transmitter sites than required for the Loran and GPS systems in which the mobile terminals contain only receiving capability. In other systems, the mobile terminal may contain only a transmitter and the remaining system elements perform direction finding or multiple receptions of the signal from different locations to determine the position. An example of this is the SARSAT system for locating downed aircraft. In this system, the downed aircraft transmits a signal on the international distress frequency 121.5 MHz (and 273 MHz). An earth orbiting satellite relays the signal to an earth terminal. As the satellite passes overhead, the change in Doppler shift can be detected and a line of position can be determined. Multiple overhead passes by the same or similar satellites can determine a set of lines of position, the intersection of which determines the location of the downed aircraft.

It has long been known that direct sequence spread spectrum signals have useful properties for ranging and position location. Some of the earliest spread spectrum antijamming military communications systems also included an accurate ranging capability. GPS is, of course, based on the use of direct sequence spread spectrum waveforms. In GPS, a user's receiver determines its position in four dimensional space-time by making time difference measurements on the signals being received from four or more satellites in view. The satellites are positioned in inclined, 12 hour orbits and arranged so that most of the time in most places, enough satellites will be in view with adequate geometry to permit accurate position calculations. The GPS system informs navigation terminals of current satellite ephemeris information which is required for position calculations.

The Telecommunications Industry Association (TIA) in association with the Electronic Industry Association (EIA) has developed and published an Interim Standard entitled "Mobile Station-Base Station Compatability Standard for Dual-Mode Wideband Spread Spectrum Cellular System," and referred to as TIA/EIA/IS-95-A, May, 1995 (hereafter "the IS-95 standard.") The IS-95 standard supports a code division multiple access (CDMA) cellular system which synchronizes the transmissions of all cells in a cellular system using the GPS satellite downlink signals to update rubidium clocks. Thus, in the IS-95 CDMA system, timing is transferred from the GPS system directly to the cellular system.

The IS-95 CDMA system can determine the location of a mobile station in three dimensional space-time (time plus two dimensional positioning) provided that the mobile receiver is able to receive and track the pilot signals of three neighboring base stations and is provided with accurate location information of the base stations. Likewise, if three IS-95 base stations are able to make timing measurements of a mobile's signal, the system can determine the location of the mobile station. The IS-95 CDMA system implements the universal frequency reuse principal, wherein all sectors and all cells in the system normally operate on the same frequency. This universal frequency reuse principal is central to CDMA's achievement of high system capacity. However, the implementation of the universal frequency reuse prinicpal in a CDMA system can make locating a mobile station problematic in those instances where a mobile station comes close to a base station. In such instances, it may become difficult to achieve an adequate SNR when trying to receive the neighboring base stations. More particularly, transmissions from the neighboring base stations will be jammed by the close-by base station—a classic near/far problem.

A power control system, as described in patents (give the QUALCOMM power control patent numbers), is necessary to solve the near/far problem for the mobile to base station communication link. As the mobile comes close to one base station, it reduces its transmitter power accordingly so as to achieve a just adequate Eb/No at the closest base station. This results in a lower Eb/No at the neighboring base stations, perhaps making it difficult to receive the mobile's signal at these locations. Thus, as a result of the power control system, neighboring base stations will typically have difficulty measuring mobile signal timing when a mobile unit is positioned near a close-by base station.

In the IS-95 CDMA system, the processing gain is nominally 21 dB. This is simply the ratio of the chip rate (1.2288 MHz) to the maximum data rate (9600 bps). At a point equidistant between two base stations, the overall SNR is approximately 0 dB. The pilot level relative to total signal level of a base station is about $-10$ dB. The resulting SNR at the halfway point between two base stations, even when using a 9600 Hz processing bandwidth, after the processing gain, is +11 dB. This is more than adequate to obtain good timing measurements. However, when the mobile station moves to a point closer to one base station than another, the transmitter power will be reduced. This will lower the received Eb/No at the further away base station. The measurement SNR can be raised by integrating over a longer time interval than a single bit time, effectively increasing the processing gain. For example, if the signal were to be integrated over one code repetition or 32768 chips, the SNR is improved by 24 dB compared to the SNR at 9600 bps because the processing gain becomes 45 dB ($10*\log 32768$). If a 5 dB SNR is needed for good time tracking, then the signal at the far base station can be 30 dB weaker than the close base station. This SNR or better can be achieved in about 90% of the cell area, assuming 4th power propagation. Thus, in 90% of the system's coverage area, the base stations will be typically be capable of time difference measurements in support of positioning, provided that good base station geometry is available to obtain accurate positioning. The 10% of the cell area where time difference measurements between base stations is not available (with the above specified integration time) corresponds to the center of the cell area out to approximately 30% of the maximum cell radius. Thus, for base stations separated by 4 miles (2 mile cell radius) the radius of the area where positioning cannot be done with the above bandwidth assumptions is about 1000 meters.

It should be noted that there are limitations as to the time of integration that might be employed due to Doppler considerations. For example, if a mobile is traveling at 60 mph on a line between two base stations, the differential Doppler is about $2 \times 10^{-7}$. This amounts to about 170 Hz in the 800 MHz cellular band. This is sufficient Doppler to make integration over 32768 chips somewhat difficult. Thus, the above estimates should be taken as best case.

The basic method of mobile station receive only positioning is described above. In this method, the mobile must receive three or more cell pilot signals from three or more nearby base stations and calculate time differences of arrival of the pilot signals. These arrival time differences allow hyperbolic lines of position to be determined, with the mobile terminal's position being where these hyperbolic lines intersect. However, for the reasons explained above, when the mobile is too close to a base station to obtain an adequate SNR on the two farther away cells, the required signal arrival time differences cannot be easily measured, and therefore some other method must be utilized to determine the position of the mobile station.

It is therefore an object of the present invention to provide a mobile radio positioning system, wherein the position of the mobile radio may determined if the mobile radio is positioned close-by to the closest base station.

These and other objects and advantages of the invention will become more fully apparent from the description and claims which follow or may be learned by the practice of the invention.

SUMMARY OF THE INVENTION

The present invention is directed to a method for determining the position of a mobile station within a cellular telephone system having a plurality of cells. For each cell in the system, a radio frequency (RF) channel is designated as being unavailable for transmitting telephone voice information signals to mobile stations within the cell. For each cell, the designated RF channel is selected from a plurality of candidate RF channels. The RF channels designated as being unavailable for transmitting voice information signals are selected for the various cells in the system such that neighboring cells within the system have different RF channels designated as unavailable for transmitting said telephone voice information signals. During an ongoing call, the mobile station is switched from an RF channel designated as available for transmitting telephone voice information signals to an RF channel designated as unavailable for transmitting telephone voice information signals and, while the mobile station is on the channel designated as unavailable for transmitting telephone voice information signals, the mobile station makes positional measurements on the RF channel designated as unavailable for transmitting telephone voice information signals. The position of the mobile station is determined in accordance with the positional measurements.

In accordance with a further aspect, the present invention is directed to a method for determining the position of a mobile station within a cellular telephone system having a plurality of cells. Voice information signals are transmitted between a first base station transmitter and a mobile station on a transmission channel. Thereafter, transmissions from the first base station transmitter of voice information signals on the transmission channel are ceased for a predetermined period of time. During the predetermined period of time when transmissions of voice information signals from the first base station transmitter have ceased on the transmission channel, the mobile station makes positional measurements. The position of the mobile station is determined in accordance with the positional measurements.

BRIEF DESCRIPTION OF THE DRAWINGS

In order that the manner in which the above-recited and other advantages and objects of the invention are obtained and can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

DESCRIPTION OF PREFERRED EMBODIMENTS

FIGS. 1–12 illustrate systems for positioning a mobile radio within a cellular telephone system, in accordance with preferred embodiments of the present invention. The positioning systems illustrated in FIGS. 1–12 are each preferably implemented as part of a cellular telephone system that uses spread spectrum modulation techniques for communicating between mobile units and base stations in the cellular telephone system. Exemplary telephone systems having mobile radio units and base stations that utilize such spread spectrum modulation (or CDMA) techniques for communicating within a cellular telephone system are disclosed in U.S. Pat. No. 5,103,459 entitled "System and Method for Generating Signal Waveforms in a CDMA Cellular System" and U.S. Pat. No. 5,109,390 entitled "Diversity Receiver in a Cellular Telephone System." The contents of U.S. Pat. Nos. 5,103,459 and 5,109,390 are hereby incorporated herein in their entirety by reference. Mobile radio units and base stations of the type disclosed in U.S. Pat. Nos. 5,103,459 and 5,109,390 will be referred to hereafter as CDMA mobile stations and CDMA base stations, respectively.

Figure 1:
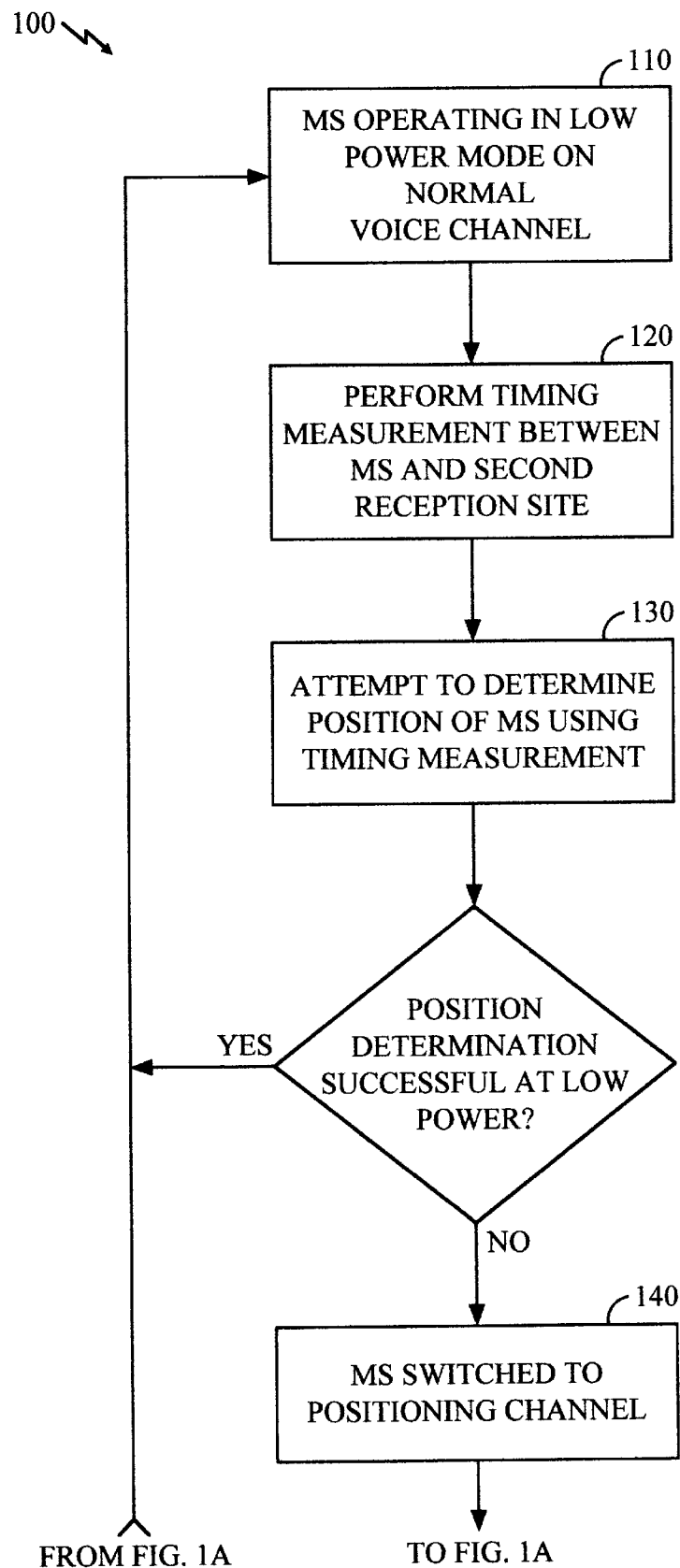
FIGS. 1 and 1A show the operation of a mobile radio positioning system where a mobile station is switched to a positioning channel and power transmissions from the mobile station are temporarily increased in order to allow timing measurements to be made between the mobile station and neighboring base stations, in accordance with a preferred embodiment of the present invention.
Figure 1A:
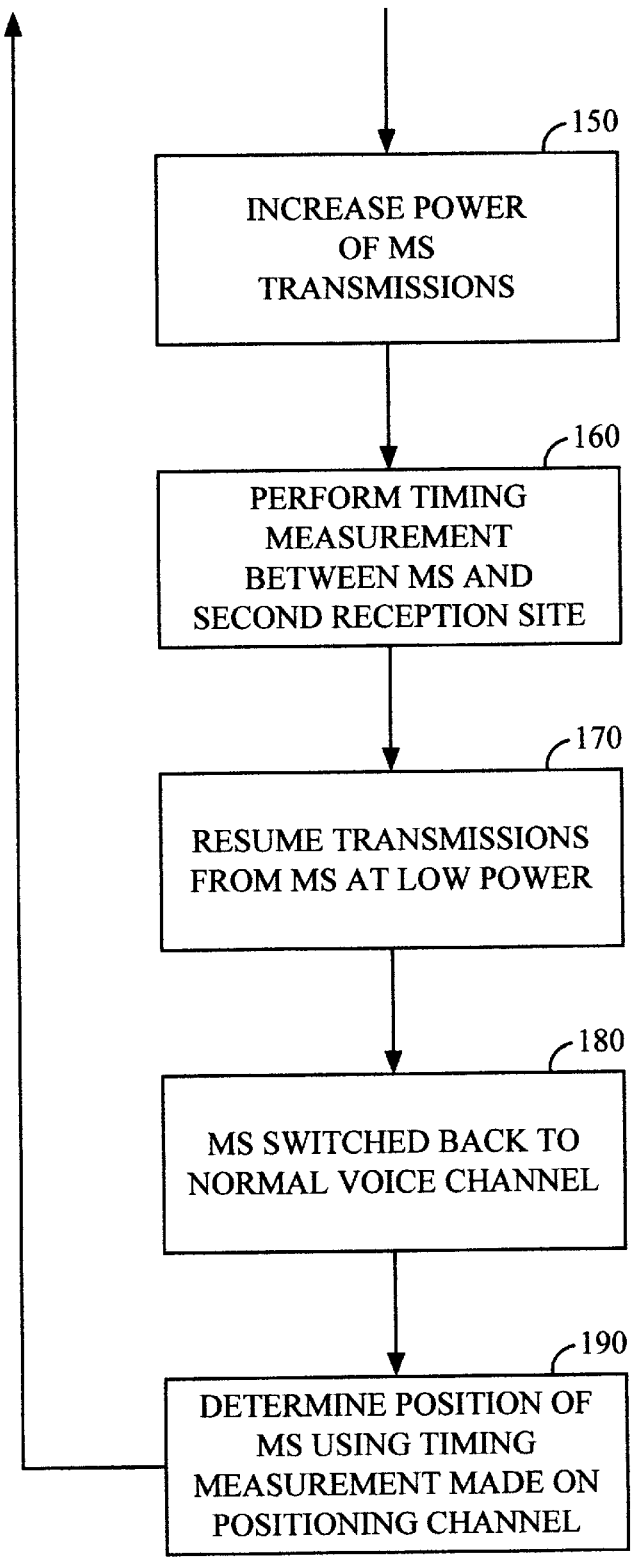

Referring now to FIGS. 1 and 1A, there is shown the operation of a mobile radio positioning system 100 where a CDMA mobile station is switched to a positioning channel and power transmissions from the CDMA mobile station are temporarily increased in order to allow timing measurements to be made between the mobile station and neighboring CDMA base stations, in accordance with a preferred embodiment of the present invention. Positioning system 100 is invoked initially at step 110 when a CDMA mobile station (or mobile radio) is in voice communication on a normal RF traffic channel with one or base stations in the cellular system. As explained above in the background, when the mobile station is operating on a normal RF traffic channel, its power level is carefully controlled and maintained at the lowest possible level in order to maintain a high traffic capacity. This low power level is sufficient to allow the mobile station to communicate on the normal RF traffic channel with a closest-by base station (or first base station). When the mobile station is in such communication with the closest-by base station, the closest-by base station uses its transmitter and receiver to perform a round trip time measurement which represents the time it takes for a radio signal to propagate from the closest-by base station to the mobile station and then from the mobile station back to the closest-by base station. More particularly, the base station transmitter has a transmission clock which supplies a transmission clock synchronization setting (or a relative transmission time) when a CDMA radio signal is transmitted by the base station. In addition, the base station receiver has means for demodulating a CDMA signal received back from a mobile station, and for determining a reception clock synchronization setting (or a relative reception time) associated with when such signal is received at the base station. In step 110, by comparing the difference between the transmission clock synchronization setting and the reception clock synchronization setting, the base station is able to perform a round trip time measurement which represents the time it takes for a radio signal to propagate from the base station to the mobile station and then from the mobile station back to the base station. By multiplying this round trip time measurement by the signal propagation speed (i.e., the speed of light), a relative distance between the mobile station and the closest-by base station can be determined. The round trip time measurement places the mobile station on a circle having a radius equal to such relative distance and centered about the closest-by base station.

Next, in step 120, the system attempts to perform a timing measurement between the mobile station and a neighboring base station (or second base station). In step 120, this measurement is attempted while the mobile station is operating on the normal RF traffic channel at low power. The timing measurement made in step 120 may consist of a round trip signal propagation time measurement between the mobile station and the second base station. Alternatively, the timing measurement which is attempted in step 120 may correspond to the time difference at which the signal from the mobile station is respectively received at the first and second base stations. By multiplying such an arrival time difference by the signal propagation speed (i.e., the speed of light), either a hyperbolic line of position for the mobile station between the first and second base station or a further circular line of position for the mobile station can be determined. Next, in step 130, the system attempts to determine the position of the mobile station based on the timing measurements made in steps 110 and 120. More particularly, the system attempts to find intersections between the circular line of position determined in step 110 and the circular (or hyperbolic) line of position determined in step 120. If the system finds more than one such intersection, the exact position of the mobile station may be resolved by using a sector antenna at one of the base stations to select the intersection that represents the true position of the mobile station in the cellular system. Alternatively, in the event that the system finds more than one such intersection, a further arrival time difference measurement between one of the first or second base stations and a third base station may be used to resolve the true position of the mobile station.

If the system was unable to successfully perform any timing measurement in step 120 because, for example, the mobile radio station was operating at a power level that was below the minimum power required for the second base station to properly receive the mobile station's signal, then processing proceeds to step 140 where the mobile radio station is switched from the normal RF traffic channel to a special RF positioning channel. This special RF positioning channel represents a normal CDMA channel having the capacity to support voice communication, but which is separate from the normal RF traffic channel used in steps 110–130. The same RF channel is preferably used for this special RF positioning channel throughout every cell in the CDMA cellular system. Thereafter, in step 150, while the mobile station is operating on the positioning channel, the power of the transmissions from the mobile station are increased to their maximum possible power level. While the transmissions from the mobile station are being made at this increased power level, a timing measurement is made in step 160 between the mobile station and a neighboring base station. The timing measurement made in step 160 is identical to that made in step 120, except that in step 160 the timing measurement is made using a signal that has been transmitted from the mobile unit at an increased power level. In steps 170 and 180, the power of transmissions from the mobile station are decreased to their normal low level and the mobile station is switched back to the normal RF traffic channel. The period of time between steps 150 and 170 during which the mobile station is operating at its increased power level should be sufficient to allow the timing measurement made in step 160 to be successfully completed, and this time period may be as short as the period of one voice frame in the signal transmitted from the mobile station.

Finally, in step 190, the system determines the position of the mobile station based on the timing measurements made in steps 110 and 160. More particularly, the system find one or more intersections between the circular line of position determined in step 110 and the circular (or hyperbolic) line of position determined in step 160. If the system finds more than one such intersection, the exact position of the mobile station may be resolved by using a sector antenna at one of the base stations to select the intersection that represents the true position of the mobile station in the cellular system. The process shown in FIGS. 1 and 1A is preferably repeated periodically in order to maintain current position information on a mobile station as it moves within the cellular system. The process may be repeated, for example, at a time interval equivalent to one out of every 100 voice frames in the signal transmitted by the mobile station, or alternatively, every one to three seconds.

It will be understood by those skilled in the art that the position calculations made in steps 130 and 190 may be performed either within one or more base stations or within the cellular system's switching center.

In the embodiment described above, the power of the transmissions from the mobile station are initially increased to their maximum possible power level in step 150. In an alternative preferred embodiment, the power level of the mobile station may be gradually ramped-up at, for example, 20 db intervals, until such time as the second base station can successfully perform the timing measurements required by step 160.

In the preferred embodiment of the present invention, a map matching table is used in steps 140 and 190 to improve the accuracy of the position determination made by the system. Since the timing measurements made by system 100 preferably correspond to signal propagation times (or differences in signal propagation times), positioning accuracy will be degraded by poor geometry between the mobile station and the base stations or by bent signal propagation paths. A map matching table is formed by assuming that the mobile station will be within a vehicle traveling on a public road and then compensating for poor base station geometry and bent propagation paths that will result in positional calculation errors at various points in such roads. A preferred method for developing such a map matching table would be to be perform a survey of an area by driving a mobile station along the various roads in the area. While the mobile station is being driven around, the timing measurements described above are performed at various locations in the area. In addition, at each such location, the actual position of the mobile station is determined by using, for example, GPS, and this actual position is stored as entry in the table along with the timing measurements performed at the location. The timing measurements made in steps 110, 120 and/or 160 are then compared to the timing measurements stored in the table, and the entries from the table which have timing measurements that most closely match the timing measurements made in steps 110, 120 and/or 160 are selected. The position of the mobile station is then determined by interpolating between the actual positions stored in the table for each of the selected entries.

Finally, although system 100 as described above has been implemented as part of a spread spectrum or CDMA cellular system, it will be understood by those skilled in the art that the steps of system 100 may be implemented in connection with other modulation systems such as, for example, time division multiple access modulation systems, in order to determine the position of mobile stations operating within such systems.

Figure 2:
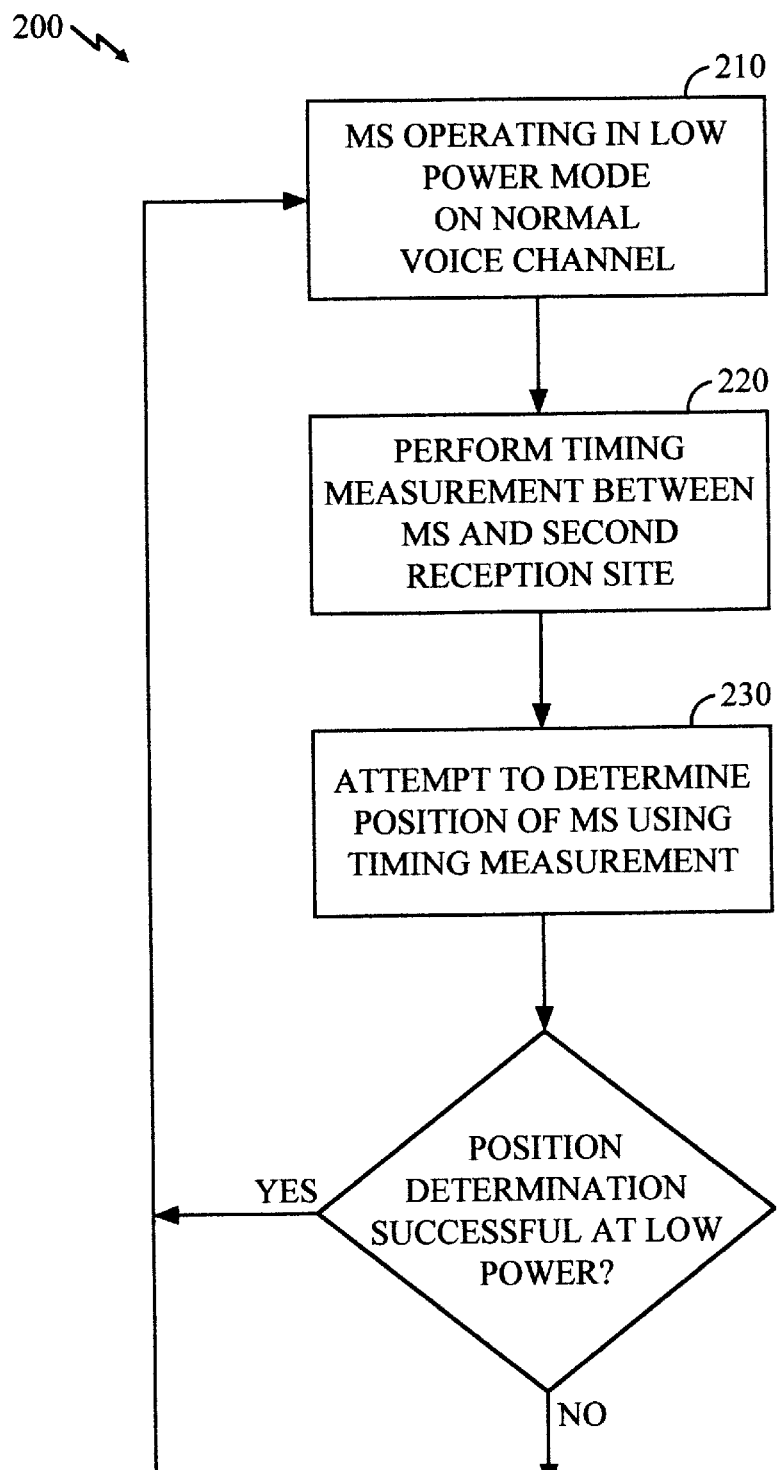
FIGS. 2 and 2A show the operation of a mobile radio positioning system where power transmissions from the mobile station are temporarily increased in order to allow timing measurements to be made between the mobile station and neighboring base stations, in accordance with a preferred embodiment of the present invention.
Figure 2A:
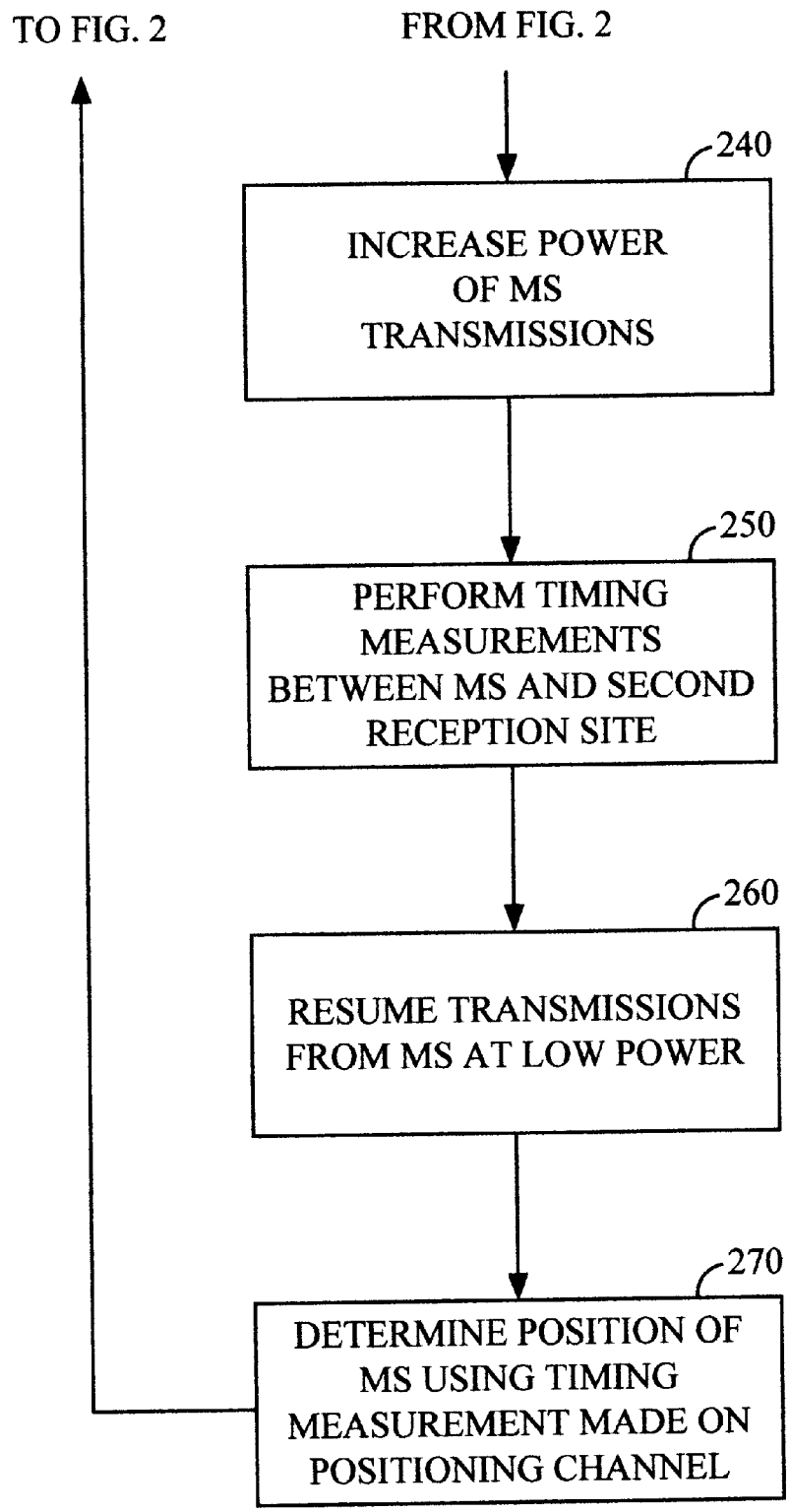

Referring now to FIGS. 2 and 2A, there is shown the operation of a mobile radio positioning system 200 where power transmissions from the mobile station are temporarily increased in order to allow timing measurements to be made between the mobile station and neighboring base stations, in accordance with a preferred embodiment of the present invention. System 200 functions substantially the same as system 100, except that in system 200 the mobile station is not switched to a separate positioning channel before its power level is increased so as to allow timing measurements to made at a second neighboring base station. Thus, steps 210, 220 and 230 correspond substantially to steps 110, 120 and 130, respectively, and steps 240, 250, 260 and 270 correspond substantially to steps 150, 160, 170 and 190 respectively. System 200 may have a disadvantage when compared against system 100 because, in system 200, other mobile stations operating on the normal RF traffic channel may suffer a frame error when the mobile station being positioned increases its power level between steps 240 and 260. However, CDMA systems are typically able to tolerate such an occasional frame error.

Figure 3:
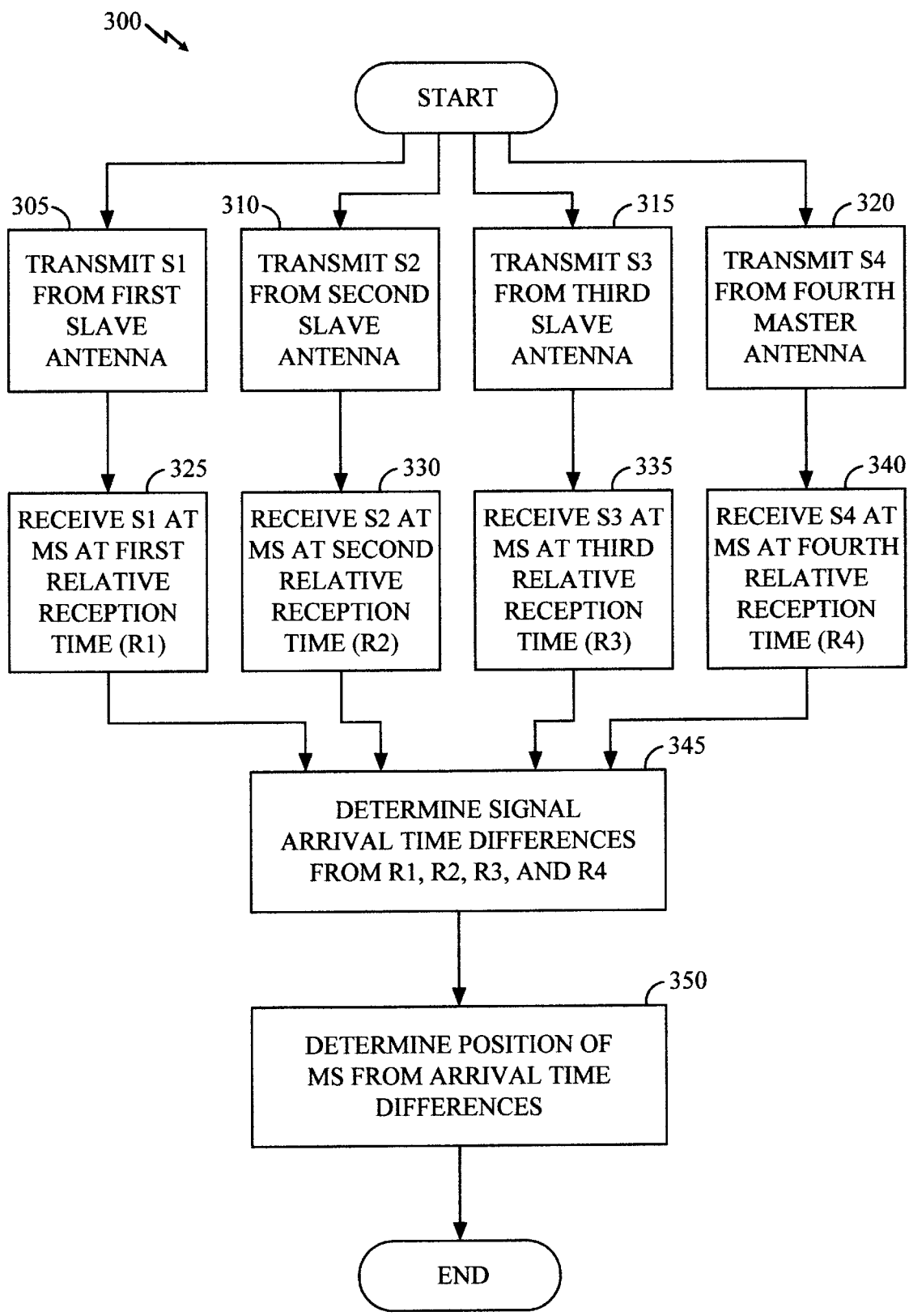
FIG. 3 shows the operation of a mobile radio positioning system where a base station having a "transmit-only" slave antenna is used for determining the mobile radio position, in accordance with a preferred embodiment of the present invention.

Referring now to FIG. 3, there is shown the operation of a mobile radio positioning system 300 where a base station having a "transmit-only" slave antenna is used for determining the mobile radio position, in accordance with a preferred embodiment of the present invention. In system 300, a modified CDMA base station is used in place of the normal CDMA base station. In this modified base station, two or more (and preferably three) transmit-only slave antennas are located proximate to (within approximately a few hundred feet of) the normal (or master) base station antenna. In the case of a three sector CDMA base station, three transmit-only slave antennas are preferably used, wherein each of the slave antennas is positioned in a different one of the three sectors. Each slave antenna has associated circuitry for transmitting CDMA signals; this associated circuitry will substantially resemble the signal transmission circuitry used for transmissions of CDMA signals from the master base station antenna. In steps 305, 310, 315 and 320, first, second, third and fourth different CDMA signals (each of which has a separate preassigned Walsh code) are respectively transmitted from the first, second and third slave antennas and the master antenna at the base station. The first, second, third and fourth signals are transmitted on a common CDMA traffic channel. In the event that the first, second and third signals are transmitted from slave antennas positioned in different sectors, the first, second and third signals will also have different pn code phases corresponding to the sectors from which such signals were transmitted. In steps 325, 330, 335 and 340, the four signals transmitted in steps 305, 310, 315 and 320 are respectively received by the mobile station. The mobile station has means for simultaneously demodulating multiple signals having different Walsh codes and different pn code phases, and for determining a clock synchronization setting (or a relative reception time) associated with each such signal. In step 345, by comparing the differences between the clock synchronization settings associated with the signals transmitted from the master antenna and the slave antennas, the mobile station is able to calculate arrival time differences corresponding to the relative times when the signals transmitted in steps 305, 310, 315 and 320 were received by the mobile station. Finally, in step 350, the arrival time differences for the signals transmitted in steps 305, 310, 315 and 320 are used to calculate at least two hyperbolic lines of position. The system then identifies one or more intersections between these hyperbolic lines of position. If the system finds more than one such intersection, the exact position of the mobile station may be resolved by using a sector antenna at the base station to select the intersection that represents the true position of the mobile station in the cellular system.

The positional calculation made in step 350 may be performed either in the mobile station, a base station or the system's switching center. In the event that the calculation is performed in the mobile station, the coordinates of the base station master antenna and the slave antennas will have to be transmitted to the mobile station before the mobile station will be able to determine the hyperbolic lines of positions described above. Alternatively, if the calculation is to be performed in the base station, the arrival time differences measured by the mobile unit will need to be transmitted to the base station before the positional calculation can be made. In the preferred embodiment of system 300, a map matching table (as described above) is used in step 350 to improve the accuracy of the position determination made by the system.

Figure 4:
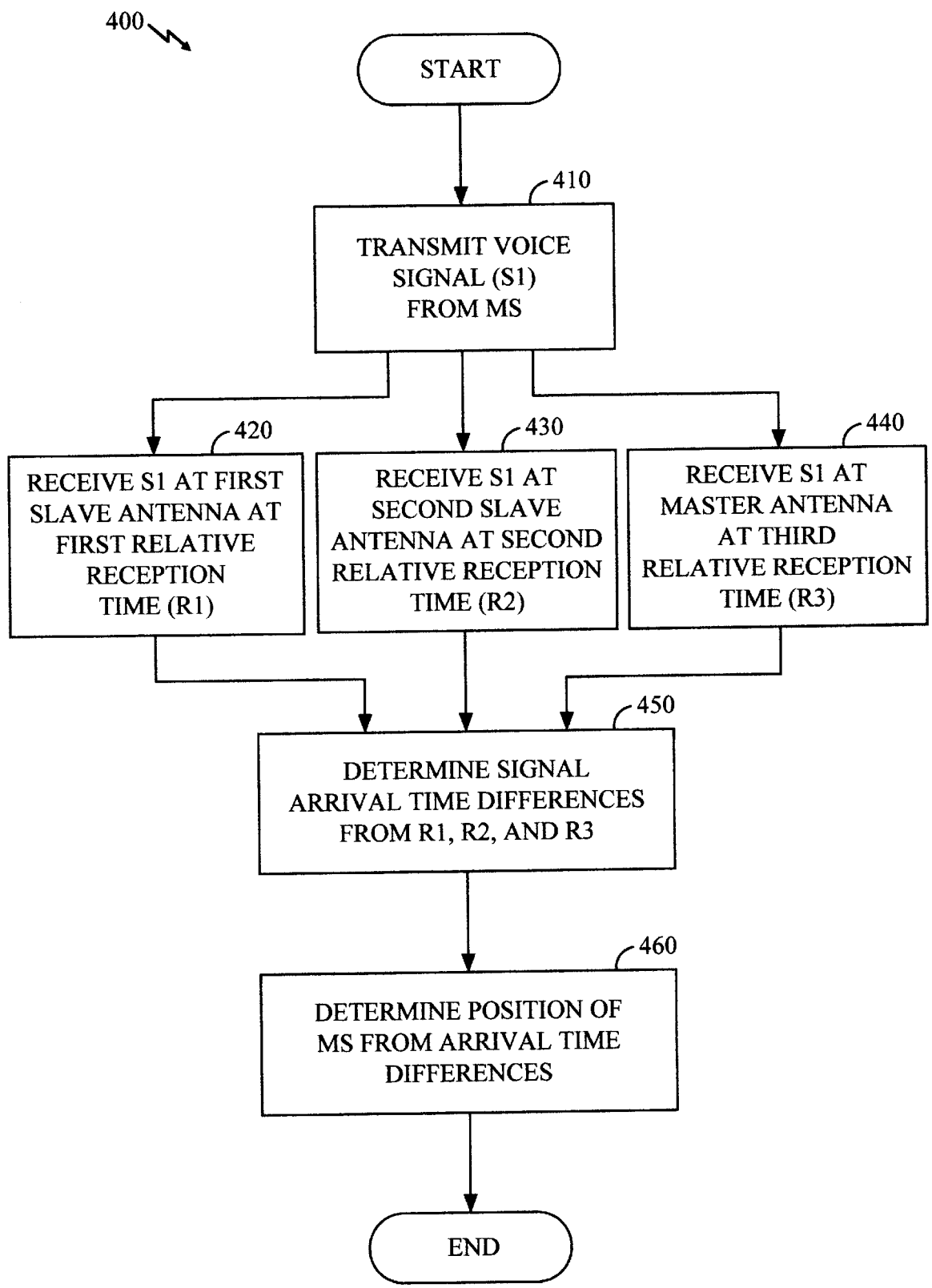
FIG. 4 shows the operation of a mobile radio positioning system where a base station having a "receive-only" slave antenna is used for determining the mobile radio position, in accordance with a preferred embodiment of the present invention.

Referring now to FIG. 4, there is show the operation of a mobile radio positioning system 400 where a base station having a "receive-only" slave antenna is used for determining the mobile radio position, in accordance with a preferred embodiment of the present invention. In system 400, a modified CDMA base station is used in place of the normal CDMA base station. In this modified base station, two or more receive-only slave antennas are located proximate to (within approximately a few hundred feet of) the normal (or master) base station antenna. Each slave antenna has associated circuitry for receiving CDMA signals; this associated circuitry will substantially resemble the signal reception circuitry used for receiving CDMA signals at the master base station antenna. In the case of a sectorized base station, it is preferable to have a receive-only slave antenna positioned within each sector. Thus, in the case of a three sector CDMA base station, three receive-only slave antennas are preferably used, wherein each of the slave antennas is positioned in a different one of the three sectors. In addition to performing the positioning function described below, these receive-only slave antennas can also be used as diversity antennas at the base station.

In step 410, the mobile station transmits a CDMA voice communication signal using the normal RF traffic channel. In steps 420, 430 and 440, the signal transmitted in step 410 is received at the base station by the first and second slave antennas and the master antenna, respectively. The two slave antennas and the master antenna each have means for demodulating the CDMA signal transmitted from the mobile station, and for determining a clock synchronization setting (or a relative reception time) associated with when the signal is received by each such antenna. In step 450, by comparing the differences between the clock synchronization settings associated with the signal received at the master antenna and the slave antennas, the base station is able to calculate arrival time differences corresponding to the relative times when the signal transmitted step 410 was received by the slave antennas and the master antenna at the base station. Finally, in step 460, the arrival time differences for the signal received in steps 420, 430 and 440 are used to calculate two hyperbolic lines of position. The system then identifies one or more intersections between these hyperbolic lines of position. If the system finds more than one such intersection, the exact position of the mobile station may be resolved by using a sector antenna at the base station to select the intersection that represents the true position of the mobile station in the cellular system.

It will be understood by those skilled in the art that the position calculations made in step 460 may be performed either within the base station or within the cellular system's switching center. In the preferred embodiment of system 400, a map matching table (as described above) is used in steps 450 and 460 to improve the accuracy of the position determination made by the system.

In an alternative embodiment of system 400, where the slave antennas were unable to receive the signal in steps 420 and 430, because, for example, the mobile radio station was operating at a power level that was below the minimum power required for the slave antennas to properly receive the mobile station's signal, then the power of the transmissions from the mobile station may be temporarily increased to a higher power level. In a preferred embodiment, this higher power level is achieved using the closed loop power control system installed in the CDMA base station. Typically, this power control system uses the signal received at the master base station antenna to adjust the power level of the mobile station. However, in the event that one or more of the slave antennas is unable to receive the mobile station in steps 420 and/or 430, the power control system preferably changes its input so as to use the weakest signal received at the slave antennas to adjust the power level of the mobile station. This method guarantees that the signal from the mobile station will be increased to a power level that is sufficient for reception at all the slave antennas. While the transmissions from the mobile station are being made at this increased power level, the timing measurements made in steps 420, 430 and 440 are then performed. Thereafter, the power of transmissions from the mobile station is decreased to the normal low level. As described above, the period of time during which the mobile station is operating at its increased power level should be sufficient to allow the timing measurements made in step 420, 430 and 440 to be successfully completed, and this time period may be as short as the period of one voice frame in the signal transmitted from the mobile station.

The process shown in FIGS. 3 and 4 are preferably repeated periodically in order to maintain current position information on a mobile station as it moves within the cellular system. Each process may be repeated, for example, at a time interval equivalent to one out of every 100 voice frames in the signal transmitted by the mobile station, or alternatively, every one to three seconds. Finally, although systems 300 and 400 as described above have been implemented as part of a spread spectrum or CDMA cellular system, it will be understood by those skilled in the art that the steps of these systems may be implemented in connection with other modulation systems such as, for example, time division multiple access modulation systems, in order to determine the position of mobile stations operating within such systems.

Figure 5:
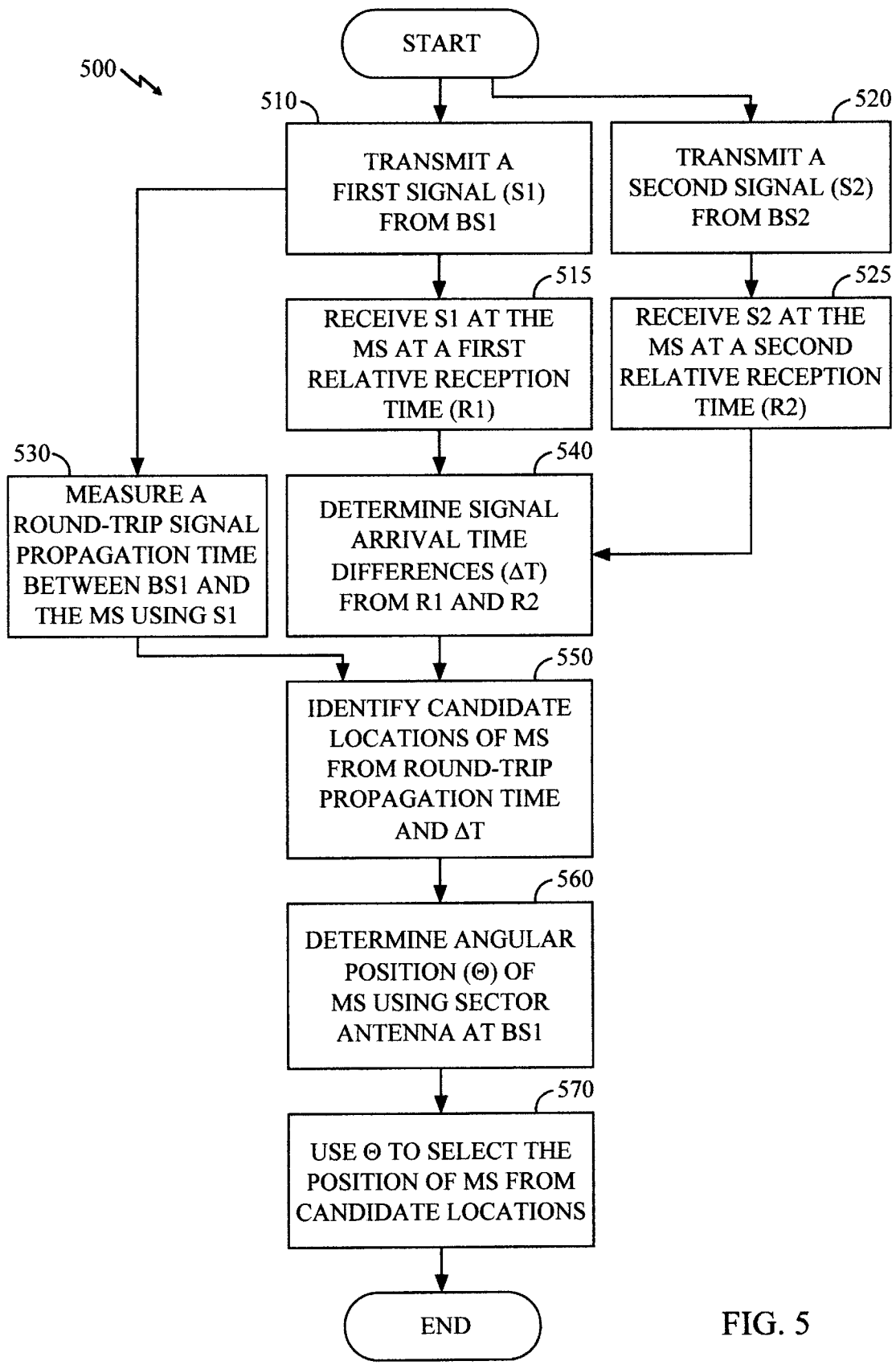
FIGS. 5–7A show the operation of mobile radio positioning systems wherein only two base stations are used for determining the position of a mobile station, in accordance with a preferred embodiment of the present invention.

Referring now to FIG. 5, there is shown the operation of mobile radio positioning system 500 wherein only two base stations are used for determining the position of a mobile station, in accordance with a preferred embodiment of the present invention. In steps 510 and 520, a first CDMA signal having a first Walsh code and a first pn code offset is transmitted from a first CDMA base station, and a second CDMA signal having a second (different) Walsh code and a second (different) pn code offset is transmitted from a second CDMA base station. The first and second signals are preferably transmitted on the normal RF traffic channel used by the first and second base stations for communicating with mobile stations in their respective areas. In steps 515 and 520, the two signals transmitted in steps 510 and 520 are respectively received by a mobile station. The mobile station has means for simultaneously demodulating multiple signals having different Walsh codes and different pn code offsets, and for determining a clock synchronization setting (or a relative reception time) associated with each such signal. In step 530, by comparing the differences between the clock synchronization settings associated with the signals transmitted from the first and second base stations, the mobile station is able to calculate an arrival time difference corresponding to the relative times when the two signals transmitted in steps 510 and 520 were received by the mobile station. This arrival time difference will place the mobile station on a hyperbolic line between the first and second base stations. Next, in step 530, the first base station will perform a round trip timing measurement between itself and the mobile station. As described above in connection with FIG. 1, such a round trip time measurement represents the time it takes for a radio signal to propagate from the first station to the mobile station and then from the mobile station back to the first station. By multiplying this round trip time measurement by the signal propagation speed (i.e., the speed of light), a relative distance between the mobile station and the first base station can be determined. The round trip time measurement thus places the mobile station on a circle having a radius equal to such relative distance and centered about the first base station.

Next, in step 550, the system identifies one or more intersections between the hyperbolic and circular lines of position which were determined based on the measurements made in steps 530 and 540. Each such intersection represents a candidate location where the mobile station may be located. If the system finds more than one such intersection, a sector antenna at one of the two base stations (or alternatively a sector antenna at a slave antenna) is used in step 560 to determine the angular sector in which the mobile is located. In a preferred embodiment, the sector antennas will divide their reception areas into three 120 degree sectors. If slave antennas are used in step 560, the boundary lines between such sectors will preferably point at other slave antennas in the system. Finally, in step 570, the position of the mobile station is determined by selecting the candidate location positioned within the sector identified in step 560. As described above in connection with FIGS. 1–4, the positional calculations made in steps 550 and 570 may be performed either within the mobile station or in one of the base stations.

Figure 6:
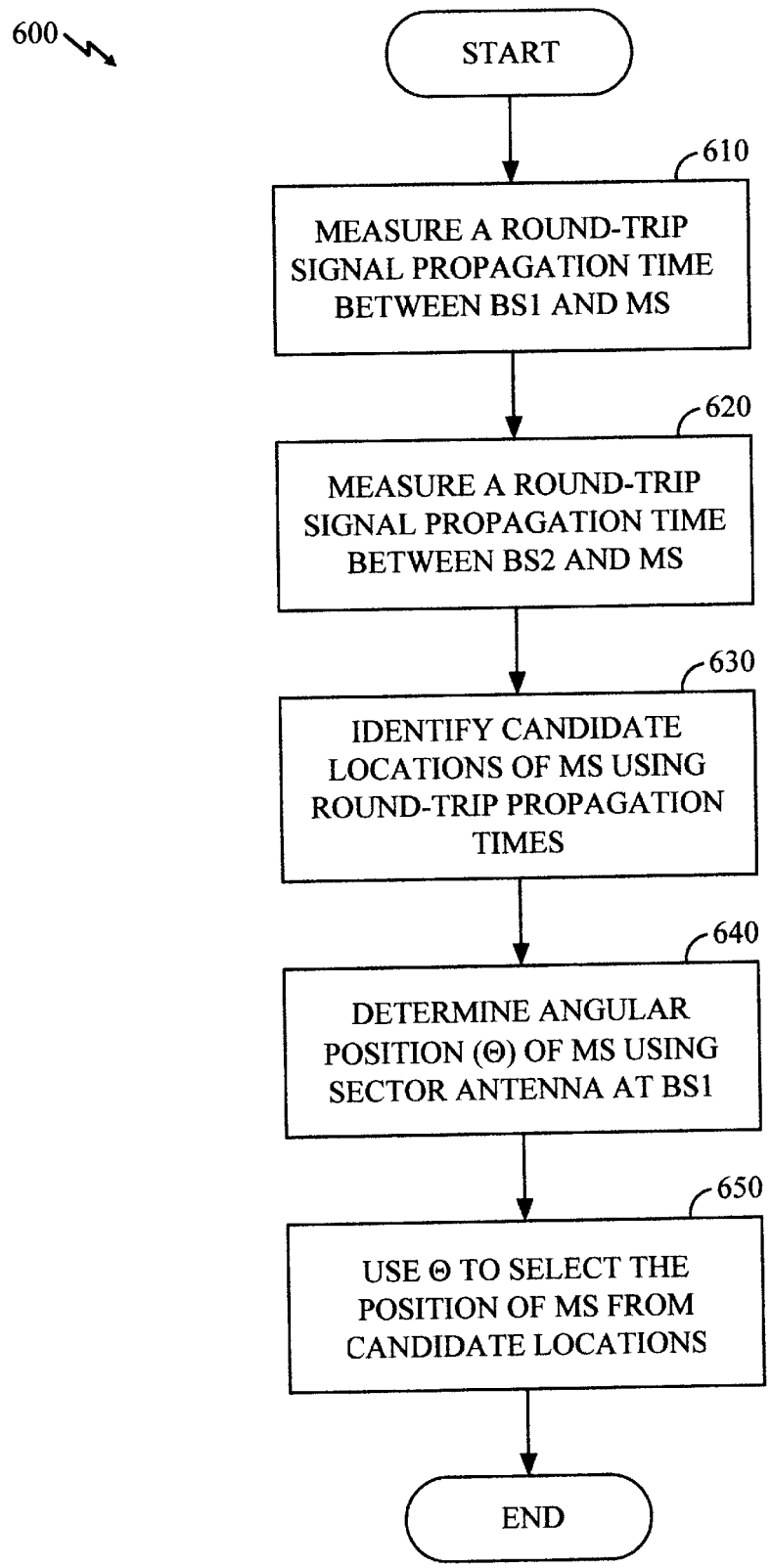

Referring now to FIG. 6, there is shown the operation of mobile radio positioning system 600 wherein only two base stations are used for determining the position of a mobile station, in accordance with an alternative preferred embodiment of the present invention. In step 610, a first base station performs a first round trip timing measurement between itself and the mobile station. As described above, this first round trip time measurement places the mobile station on a first circle centered about the first base station. Next, in step 620, a second base station performs a further round trip timing measurement between itself and the mobile station. This second round trip time measurement places the mobile station on a second circle centered about the second base station.

Next, in step 630, the system identifies one or more intersections between the first and second circular lines of position which were determined based on the measurements made in steps 610 and 620. Each such intersection represents a candidate location where the mobile station may be located. If the system finds more than one such intersection, a sector antenna at one of the two base stations (or alternatively a sector antenna at a slave antenna) is used in step 640 to determine the angular sector in which the mobile is located. In a preferred embodiment, the sector antennas will divide their reception areas into three 120 degree sectors. If slave antennas are used in step 640, the boundary lines between such sectors will preferably point at other slave antennas in the system. Finally, in step 650, the position of the mobile station is determined by selecting the candidate location positioned within the sector identified in step 640. As described above in connection with FIGS. 1–4, the positional calculations made in steps 630 and 650 may be performed either within the mobile station or in one of the base stations. In addition, a map matching table may be used to enhance the accuracy of the candidate locations identified in step 630.

Figure 7:
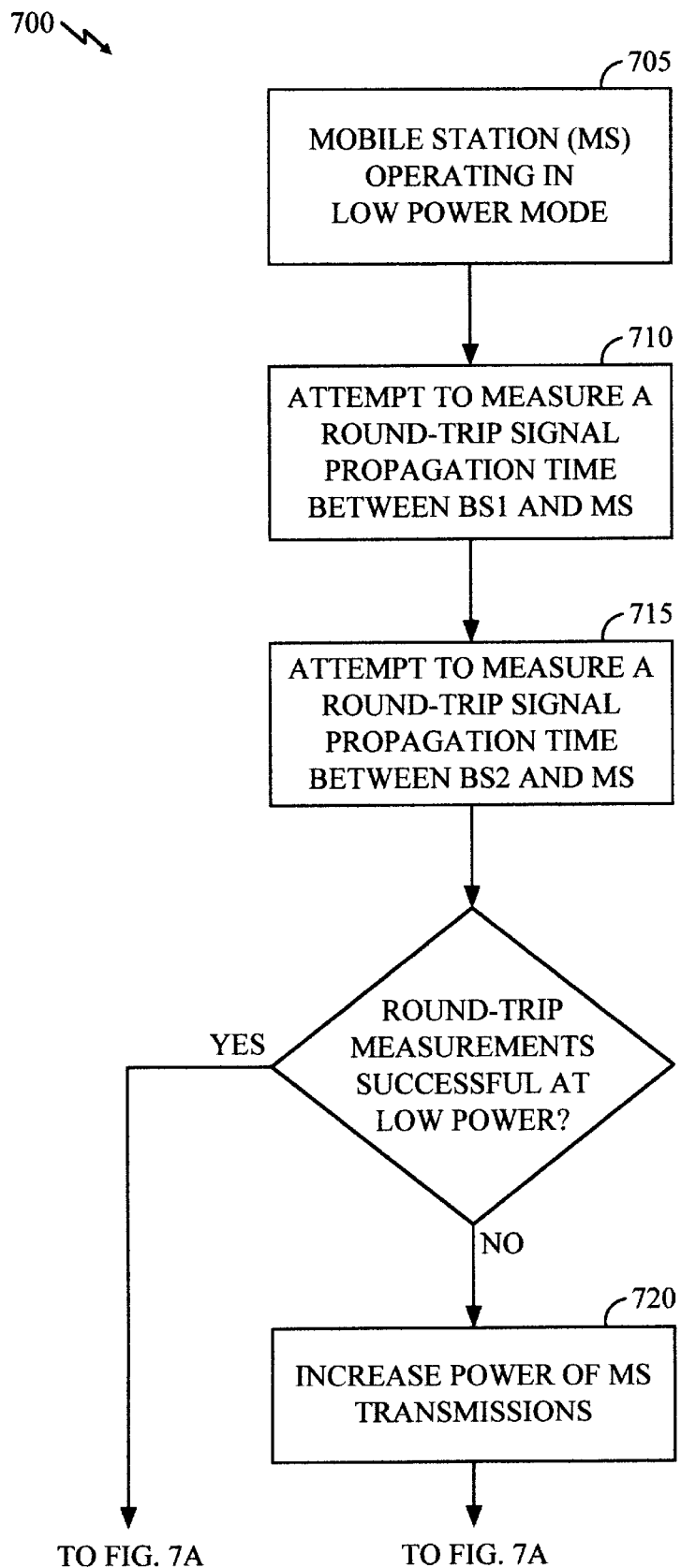
Figure 7A:
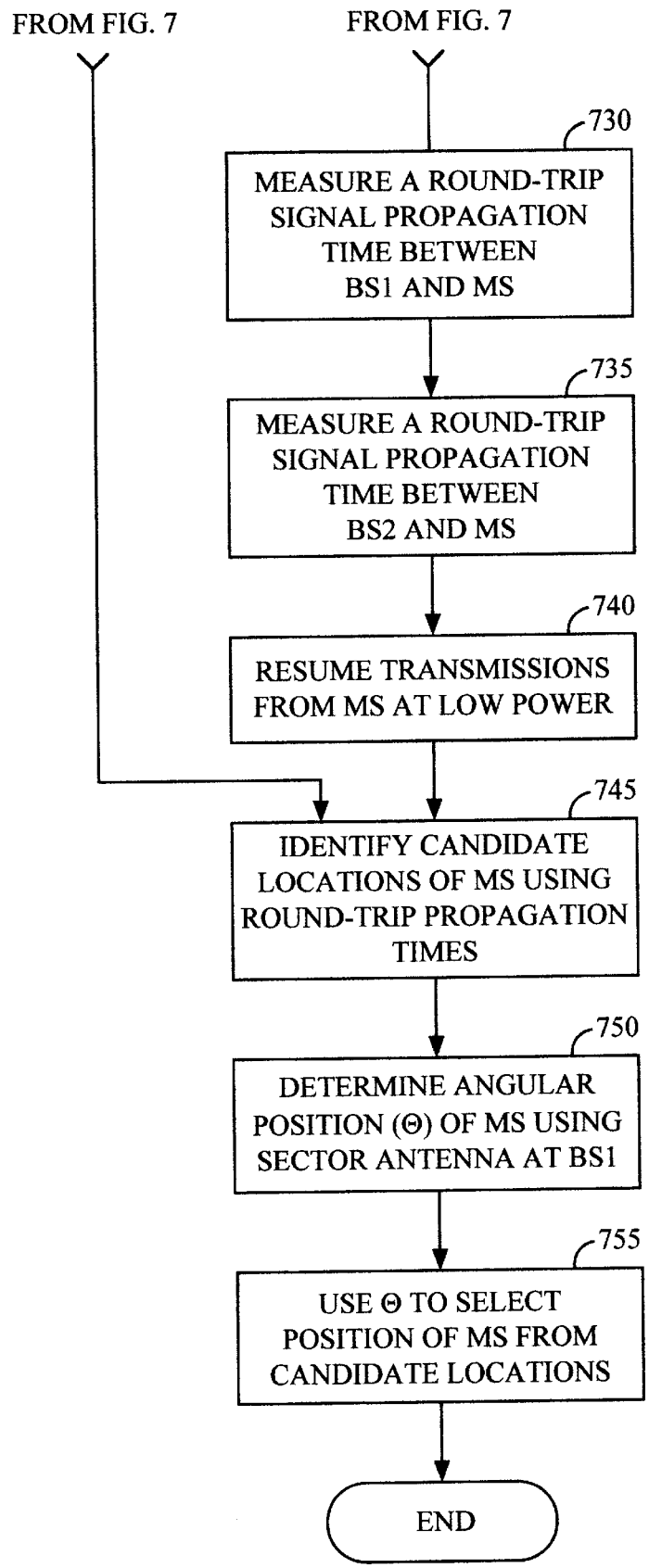

Referring now to FIG. 7, there is shown the operation of mobile radio positioning system 700 wherein only two base stations are used for determining the position of a mobile station, in accordance with a still further alternative preferred embodiment of the present invention. System 700 is similar to system 600, except in system 700, if the first and second base stations are unable to perform round trip timing measurements because the power level of the mobile station's transmissions is too low, the power level of the mobile station's transmissions is temporarily increased in order to allow such timing measurements to be made.

Referring still to FIG. 7, positioning system 700 is invoked initially at step 705 when a CDMA mobile station is in voice communication at low power on a normal RF traffic channel with one or base stations in the cellular system. This low power level is sufficient to allow the mobile station to communicate on the normal RF traffic channel with a closest-by base station (or first base station). In step 710, when the mobile station is in such communication with the first base station, the first base station uses its transmitter and receiver to attempt to perform a round trip time measurement which represents the time it takes for a radio signal to propagate from the first base station to the mobile station and from the mobile station back to the first base station. In step 720, while the mobile unit is still transmitting in its low power mode, a neighboring base station (or second base station) uses its transmitter and receiver to attempt to perform a round trip time measurement which represents the time it takes for a radio signal to propagate from the second base station to the mobile station and from the mobile station back to the second base station. If the system is able to successfully perform the round trip timing measurements in steps 710 and 715, processing proceeds to steps 745, 750 and 755, where the position of the mobile station is determined based on such round trip timing measurements. Steps 745, 750 and 755 determine the position of the mobile station in substantially the same manner as steps 630, 640 and 650, respectively, described above.

If system 700 was unable to successfully perform the timing measurements in steps 705 and 710 because, for example, the mobile radio station was operating at a power level that was below the minimum power required for the second base station to properly receive the mobile station's signal, then processing proceeds to step 720 where the power of the transmissions from the mobile station are increased to their maximum possible power level. While the transmissions from the mobile station are being made at this increased power level, the timing measurements that were attempted originally in steps 705 and 710 are made in steps 730 and 735. The timing measurements made in step 730 and 735 are identical to those attempted in steps 705 and 710, except that in steps 730 and 735 the timing measurements are made using a signal that has been transmitted from the mobile unit at an increased power level. Thereafter, in step 740, the power of transmissions from the mobile station are decreased to their normal low level, and the position of the mobile station is determined in accordance with steps 745, 750 and 755 as described above. In the preferred embodiment, the period of time between steps 720 and 740 during which the mobile station is operating at its increased power level corresponds to the period of one voice frame in the signal transmitted from the mobile station.

The process shown in FIG. 7 is preferably repeated periodically in order to maintain current position information on a mobile station as it moves within the cellular system. The process may be repeated, for example, at a time interval equivalent to one out of every 100 voice frames in the signal transmitted by the mobile station, or alternatively, every one to three seconds. In addition, although systems 500, 600 and 700 as described above have been implemented as part of a spread spectrum or CDMA cellular system, it will be understood by those skilled in the art that the steps of these systems may be implemented in connection with other modulation systems such as, for example, time division multiple access modulation systems, in order to determine the position of mobile stations operating within such systems.

Figure 8:
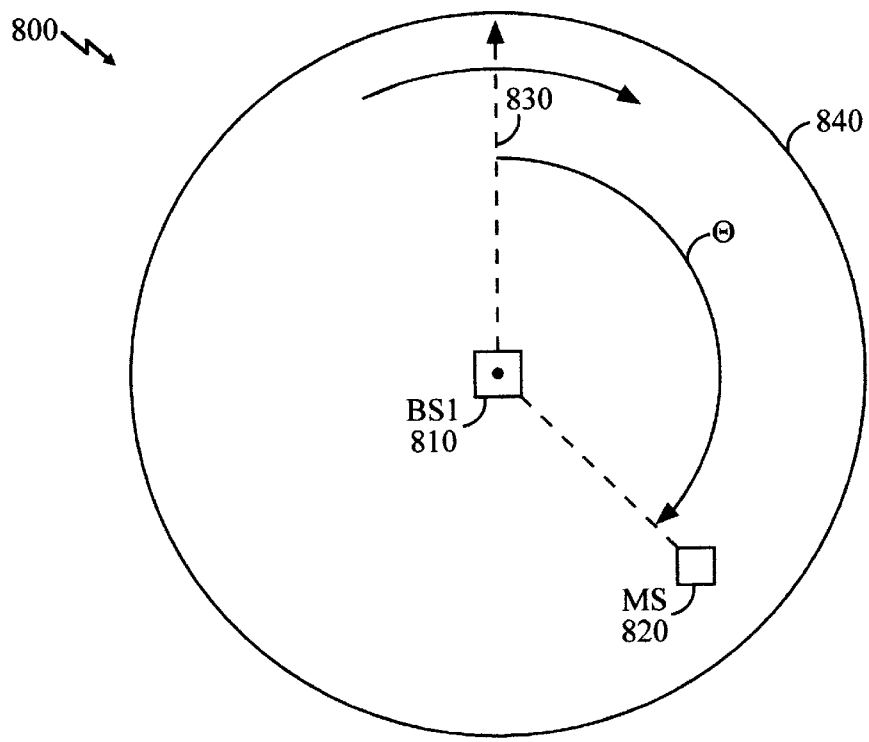
FIG. 8 shows a mobile radio positioning system that uses a base station having a rotating transmitting beam antenna for determining the position of the mobile radio, in accordance with a preferred embodiment of the present invention.

Referring now to FIG. 8, there is shown a mobile radio positioning system 800 that uses a CDMA base station 810 having a rotating transmitting beam antenna for determining the position of the mobile station 820, in accordance with a preferred embodiment of the present invention. In system 800, a signal having its own Walsh code is transmitted from a rotating antenna at base station 810. The rotating antenna has a beam 830 which rotates around a cell 840 in the cellular telephone system. The beam rotates at, for example, one rotation every two seconds. In the event that the beam is rotating through various sectors associated with base station 810, the pn code phase of the signal transmitted from the rotating antenna will change to reflect the sector that the beam is rotating through. Thus, in the case of a three-sector base station, the pn code phase of the rotating beam signal will change three times as the beam rotates one revolution around cell 840. In an alternate embodiment, both the pn code phase and the Walsh code of the rotating beam signal will change as the beam rotates around cell 840. The beam 830 has a rotational timing that is known by the mobile station 820. The mobile station receives this timing information from signals transmitted by base station 810 to mobile station 820. The rotating beam signal is received at the mobile station 820, and based on a reception time when either a null or a peak of the rotating beam signal is received by the mobile station 820, an angular displacement value (θ) corresponding to the angular position of the mobile station 820 is determined. A first round trip signal propagation time between a stationary antenna (preferably located at base station 810) and the mobile station 820 is measured using a CDMA voice information signal transmitted from the base station. The position of the mobile station is determined in accordance with the angular displacement value and the first round trip signal propagation time. More particularly, the round trip propagation time is used as described above to place the mobile station 820 on a circle centered about the base station 810, and the angular displacement value (θ) is used to identify the point along this circle where mobile station 820 is located. This calculation may be performed either in base station 810 or the cellular system's switching center. A map matching table (as described above) may also be used to enhance the accuracy of the position determination made by system 800.

Figure 9:
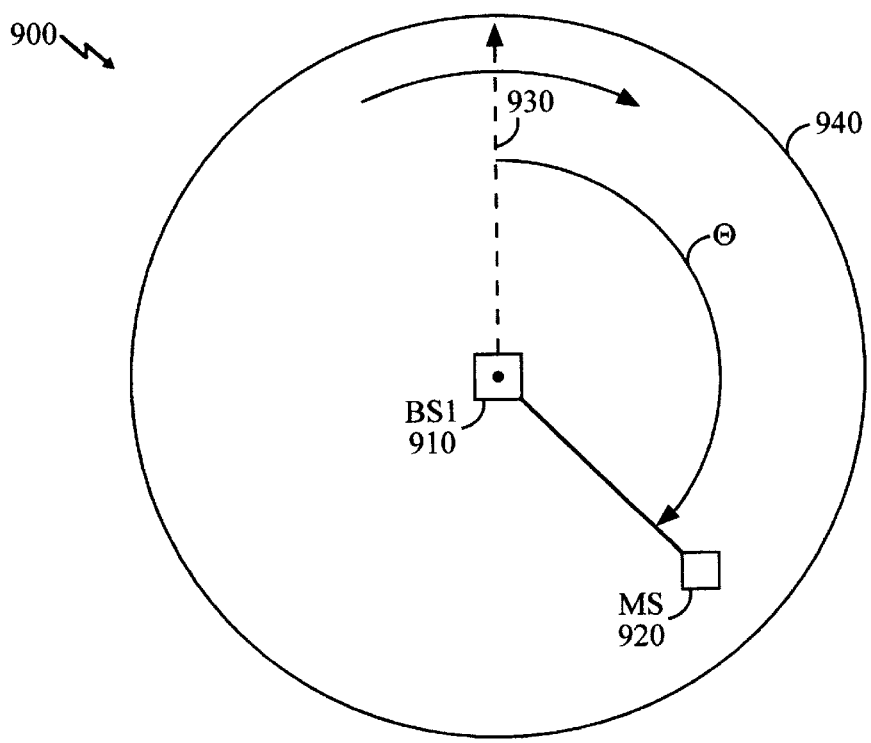
FIG. 9 shows a mobile radio positioning system that uses a base station having a rotating receiving beam antenna for determining the position of the mobile radio, in accordance with a preferred embodiment of the present invention.

Referring now to FIG. 9, there is shown a mobile radio positioning system 900 that uses a base station 910 having a rotating receiving beam antenna for determining the position of the mobile station 920, in accordance with a preferred embodiment of the present invention. In system 900, a CDMA voice information signal is transmitted from the mobile station 920. The voice information signal is received at base station 910 with a first antenna having a rotating beam 930 for receiving the signal. Beam 930 rotates about cell 940 at a regular interval. Based on a reception time when either a peak or null of the voice information signal is received by the first antenna, an angular displacement value (θ) corresponding to the angular position of the mobile station 920 is determined. A round trip signal propagation time between a second antenna (preferably located at base station 910) and the mobile station 920 is measured. The position of the mobile station 920 is then determined in accordance with the angular displacement value (θ) and the measured round trip signal propagation time. More particularly, the round trip propagation time is used as to place the mobile station 920 on a circle centered about the base station 910, and the angular displacement value (θ) is used to identify the point along this circle where mobile station 920 is located. This calculation may be performed either in base station 910 or the cellular system's switching center. A map matching table (as described above) may also be used to enhance the accuracy of the position determination made by system 900.

Again, although systems 800 and 900 as described above have been implemented as part of a spread spectrum or CDMA cellular system, it will be understood by those skilled in the art that the steps of these systems may be implemented in connection with other modulation systems such as, for example, time division multiple access modulation systems, in order to determine the position of mobile stations operating within such systems.

Figure 10:
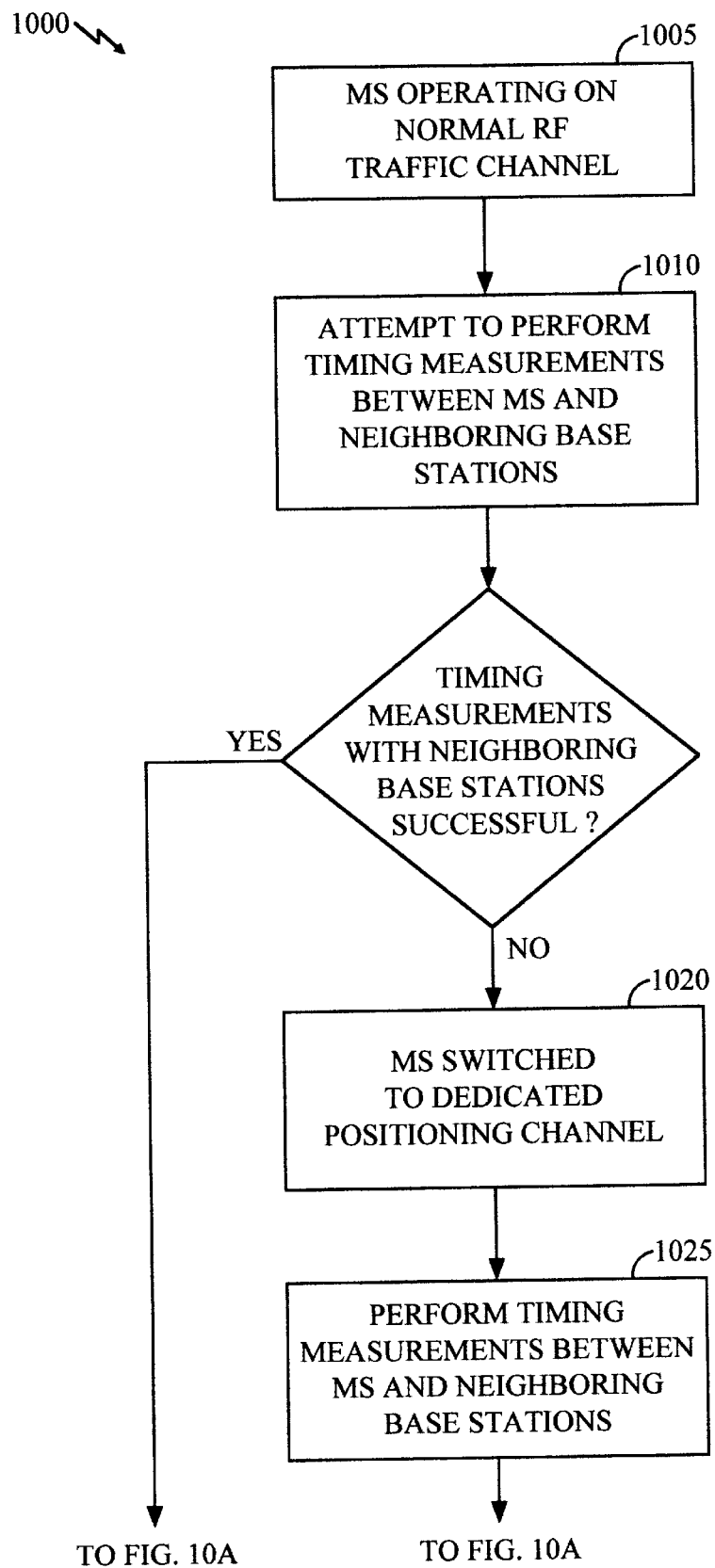
FIGS. 10 and 10A show the operation of a mobile radio positioning system wherein each cell in the cellular system has an RF channel that is dedicated for positioning uses and unavailable for voice communication, in accordance with a preferred embodiment of the present invention.
Figure 10A:
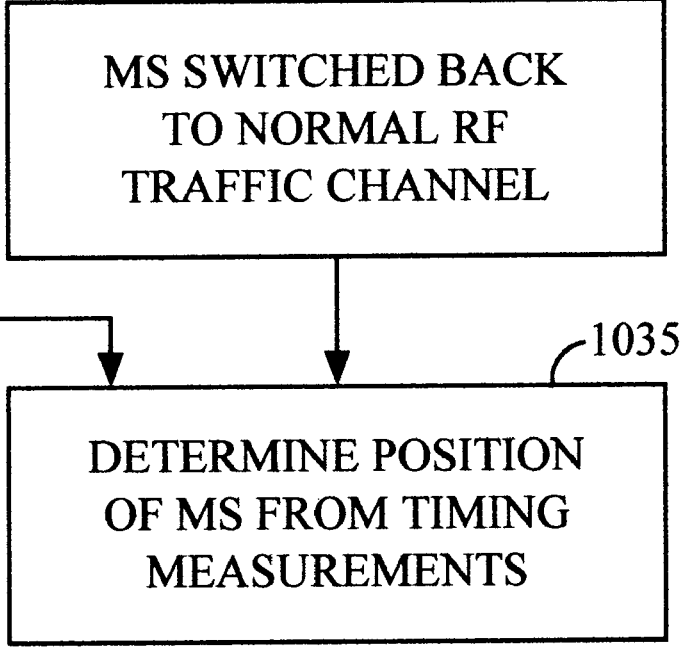

Referring now to FIGS. 10 and 10A, there is shown the operation of a mobile radio positioning system 1000 wherein each cell in the cellular system has an RF channel that is dedicated for positioning uses and unavailable for voice communication, in accordance with a preferred embodiment of the present invention. System 1000 is preferably implemented in connection with a CDMA cellular system in which each cell has a plurality of N (where N is an integer greater two) RF traffic channels, each of which has the capacity to support voice communications between a CDMA base station and a CDMA mobile station. In each cell, one of the N traffic channels is designated as a dedicated positioning channel that is normally unavailable for transmitting telephone voice information signals to mobile stations within the cell. As a result of this designated positioning channel, the CDMA base station associated with each cell in the system will have N-1 normal RF traffic channels that are available to support voice communications between the base station and a CDMA mobile station, and a single RF channel that is a dedicated positioning channel that is unavailable for supporting such voice communications. In the preferred embodiment of the present invention, the dedicated positioning channels are selected for the various cells in the system such that neighboring cells have different RF channels designated as their dedicated positioning channels.

Referring still to FIGS. 10 and 10A, system 1000 is initially invoked in step 1005 when a mobile station is communicating with a close-by base station (or first base station) on one of the normal RF traffic channels associated with the first base station. When the mobile station is in such communication with the first base station, the first base station performs a round trip time measurement which represents the time it takes for a radio signal to propagate from the first base station to the mobile station and then from the mobile station back to the first base station. This round trip time measurement thus places the mobile station on a circle centered about the first base station.

Next, in step 1010, the system attempts to perform a timing measurement between the mobile station and a neighboring base station (or second base station). In step 1010, this measurement is attempted while the mobile station is operating on a normal RF traffic associated with the first base station. The timing measurement made in step 1010 may consist of a round trip signal propagation time measurement between the mobile station and the second base station. Alternatively, the timing measurement which is attempted in step 1010 may correspond to the time difference at which the signal from the mobile station is respectively received at the first and second base stations. In the event that the system was able to successful perform such timing measurements in step 1010, processing proceeds to step 1035, where the system determines the position of the mobile station based on the timing measurements made in steps 1005 and 1010. More particularly, the system identifies one or more intersections between the circular line of position determined in step 1005 and the circular (or hyperbolic) line of position determined in step 1010. If the system finds more than one such intersection, the exact position of the mobile station may be resolved by using a sector antenna at one of the base stations to select the intersection that represents the true position of the mobile station in the cellular system.

If system 1000 was unable to successfully perform any timing measurement in step 1010 because, for example, the mobile radio station was operating at a power level that was below the minimum power required for the second base station to properly receive the mobile station's signal, then processing proceeds to step 1020 where the mobile radio station is switched from a normal RF traffic channel to the dedicated RF positioning channel associated with the first base station. While the mobile station is operating on this dedicated RF positioning channel, the mobile station can clearly receive transmissions from neighboring base stations. In step 1025, while the mobile station is on the dedicated positioning channel and able to hear such neighboring base stations, the mobile station measures an arrival time difference of signals transmitted from neighboring base stations (or, alternatively, an arrival time difference between a signal transmitted from a neighboring base station and a signal transmitted from the first base station). As described above, this arrival time difference, together with the coordinates of the appropriate base stations, can be used to place the mobile station on a hyperbola between such base stations. In steps 1030, the mobile station is switched back to a normal RF traffic channel. Finally, in step 1035 (the operation of which is described above), the system determines the position of the mobile station based on the timing measurements made in steps 1005 and 1025. The position calculations made in step 1035 may be performed either within one or more base stations or within the cellular system's switching center.

Figure 11:
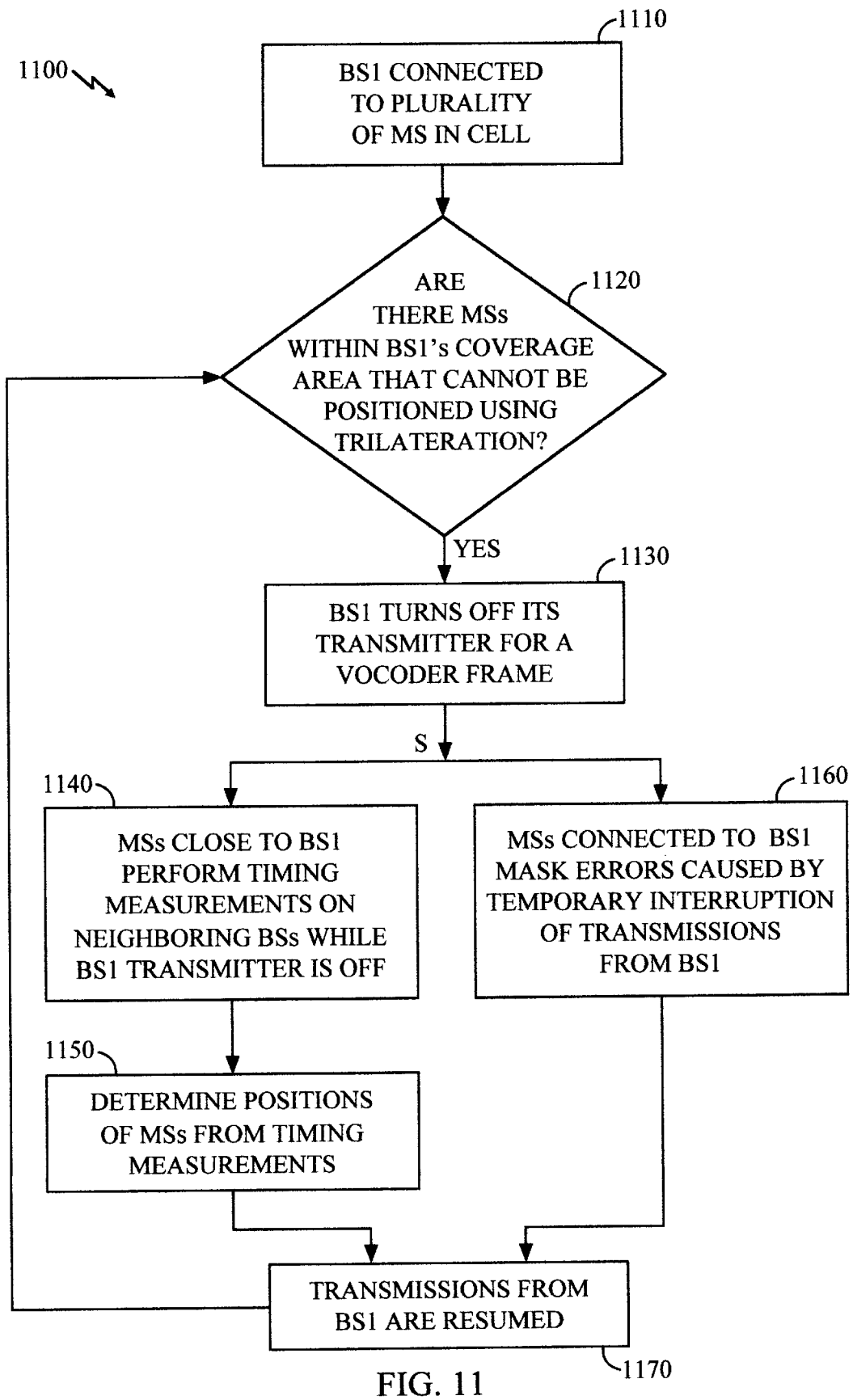
FIG. 11 shows the operation of a mobile radio positioning system where a base station transmitter turns itself off during predetermined periods to allow timing measurements to made between the mobile radio and neighboring base stations, in accordance with a preferred embodiment of the present invention.

Referring now to FIG. 11, there is shown the operation of a mobile radio positioning system 1100 where a base station transmitter turns itself off during predetermined periods to allow timing measurements to made between the mobile radio and neighboring base stations, in accordance with a preferred embodiment of the present invention. System 1100 begins at step 1110, when a first CDMA base station is in normal voice communication with a CDMA mobile station in the coverage area of the first base station. Next, in step 1120, while the first base station continues to transmit to mobile stations within its coverage area, a mobile station being positioned attempts to locate itself using trilateration, i.e, by attempting to measure signal arrival time differences between the first base station and two other neighboring base stations. Such positioning will be unsuccessful if the mobile station being positioned cannot make the required timing measurements with neighboring base stations. In the event such positioning is unsuccessful, processing proceeds to step 1130, where the first base station turns off its transmitter for a single vocoder frame. While the first base station's transmitter is silent, the mobile station being positioned measures arrival time differences of signals received from at least three neighboring base stations in step 1140. In addition, in step 1160, while the first base station's transmitter is silent, other mobile stations within the coverage area of the first base station mask any transmission errors caused by the temporary interruption of transmissions from the first base station transmitter for a vocoder frame. Next, in step 1150, the system determines the location of the mobile station being positioned based on the timing measurements made in step 1140. More particularly, the system identifies one or more intersections between hyperbolic lines of position defined by the timing measurements made in step 1140. If the system finds more than one such intersection, the exact position of the mobile station may be resolved by using a sector antenna at one of the base stations to select the intersection that represents the true position of the mobile station in the cellular system. The position calculation performed in step 1150 may be made either in the mobile station being positioned or in a base station. Moreover, a map matching table may be used as described above to enhance the accuracy of the mobile position determination made in step 1150. After the position of the mobile station is determined in step 1150, transmissions are resumed from the first base station to mobile stations within the coverage area of the first base station.

The process shown in FIG. 11 is preferably repeated periodically in order to maintain current position information on a mobile station as it moves within the cellular system. The process may be repeated, for example, at a time interval equivalent to one out of every 100 voice frames in the signal transmitted by the first base station, or alternatively, every one to three seconds. In addition, the time periods at which neighboring base stations cease transmissions in step 1130 are preferably gated such that adjacent base stations do not cease transmissions simultaneously. Finally, although system 1100 as described above is preferably implemented as part of a spread spectrum or CDMA cellular system, it will be understood by those skilled in the art that the steps of these systems may be implemented in connection with other modulation systems such as, for example, time division multiple access modulation systems, in order to determine the position of mobile stations operating within such systems.

Figure 12:
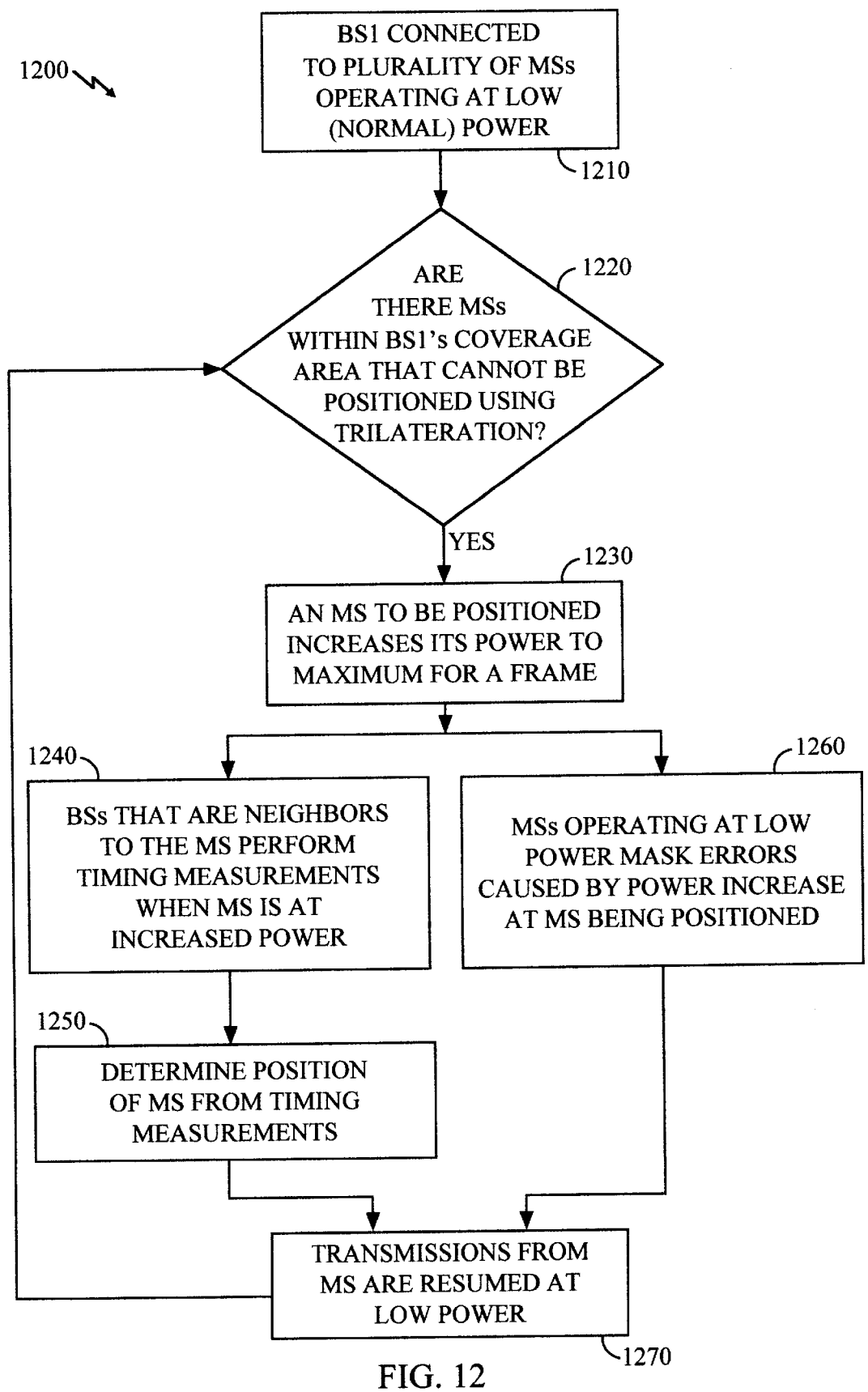
FIG. 12 shows the operation of a mobile radio positioning system where the power of a mobile station is temporarily increased for a frame in order to allow timing measurements to made between the mobile radio and neighboring base stations, in accordance with a preferred embodiment of the present invention.

Referring now to FIG. 12, there is shown the operation of a mobile radio positioning system 1200 where the power of a mobile station is temporarily increased for a frame in order to allow timing measurements to made between the mobile radio and neighboring base stations, in accordance with a preferred embodiment of the present invention. System 1200 begins at step 1210, when a first CDMA base station is in normal voice communication at a low power level with a CDMA mobile station in the coverage area of the first base station. Next, in step 1220, while the first base station continues to transmit to mobile stations within its coverage area, a mobile station being positioned attempts to locate itself using trilateration, i.e, by attempting to measure signal arrival time differences between the first base station and two other neighboring base stations. Step 1220 is substantially the same as step 1120 described in connection with FIG. 11 above. In the event such positioning is unsuccessful, processing proceeds to step 1230, where the CDMA mobile station being positioned increases its transmission power level to a maximum level for a single frame. In step 1240, while the mobile station's transmitter is at maximum power, at least three neighboring base stations measure arrival time differences of the signal transmitted from the mobile station at maximum power. In addition, in step 1260, while the mobile station's transmitter is at maximum power, other mobile stations operating at low power within the same cell as the mobile station being positioned mask any errors caused by the temporary increase in transmission power at the mobile station being positioned. Next, in step 1250, the system determines the location of the mobile station being positioned based on the timing measurements made in step 1240. More particularly, the system identifies one or more intersections between hyperbolic lines of position defined by the timing measurements made in step 1240. If the system finds more than one such intersection, the exact position of the mobile station may be resolved by using a sector antenna at one of the base stations to select the intersection that represents the true position of the mobile station in the cellular system. The position calculation performed in step 1250 may be made either in the mobile station being positioned or in a base station. Moreover, a map matching table may be used as described above to enhance the accuracy of the mobile position determination made in step 1250. After the position of the mobile station is determined in step 1250, transmissions are resumed at low power from the mobile station being positioned.

The process shown in FIG. 12 is preferably repeated periodically in order to maintain current position information on a mobile station as it moves within the cellular system. The process may be repeated, for example, at a time interval equivalent to one out of every 100 voice frames in the signal transmitted by the mobile station being positioned, or alternatively, every one to three seconds. In addition, although system 1200 as described above is preferably implemented as part of a spread spectrum or CDMA cellular system, it will be understood by those skilled in the art that the steps of these systems may be implemented in connection with other modulation systems such as, for example, time division multiple access modulation systems, in order to determine the position of mobile stations operating within such systems.

Furthermore, it is to be understood that although the present invention has been described with reference to a preferred embodiment, various modifications, known to those skilled in the art, may be made to the structures and process steps presented herein without departing from the invention as recited in the several claims appended hereto.

What is claimed is:

1. A method for determining the position of a mobile station within a cellular telephone system having a plurality of cells, comprising the steps of:

(A) selecting a cell from said plurality of cells;

(B) designating for said selected cell a radio frequency (RF) channel that is unavailable for transmitting telephone voice information signals to mobile stations within said selected cell, said designated RF channel being a dedicated positioning channel selected from a plurality of candidate RF channels;

(C) repeating steps (A) through (B) for each of said plurality of cells such that neighboring cells within said system have different RF channels designated as unavailable for transmitting said telephone voice information signals;

(D) during an ongoing telephone call, switching said mobile station from an RF channel designated as available for transmitting telephone voice information signals to an RF channel designated as unavailable for transmitting telephone voice information signals and, while said mobile station is on said channel designated as unavailable for transmitting telephone voice information signals, making positional measurements with said mobile station on said RF channel designated as unavailable for transmitting telephone voice information signals;

(E) after making said positional measurements, switching said mobile station from said RF channel designated as unavailable for transmitting telephone voice information signals to an RF channel designated as available for transmitting telephone voice information signals; and (F) determining said position of said mobile station in accordance with said positional measurements.

2. The method of claim 1, wherein, for each of said plurality of cells, each of said plurality of candidate RF channels other than said designated RF channel is available for transmitting said telephone voice information signals.

3. The method of claim 2, wherein said mobile station is positioned within a first cell having a first base station during step (D), and said step of making said positional measurements includes measuring signal propagation delay times between said mobile station and second and third base stations, wherein said second and third base stations are associated with second and third cells positioned adjacent to said first cell.

4. The method of claim 3, further comprising the step of using a map matching table to estimate said position of said mobile station from said signal propagation delay times.

5. The method of claim 2, wherein step (F) is performed within a switching center in said cellular system.

6. The method of claim 2, wherein step (E) is performed with said first base station.

7. The method of claim 2, wherein said cellular telephone system is a code division multiple access cellular telephone system.

8. The method of claim 2, wherein said cellular telephone system is a time division multiple access cellular telephone system.

9. A method for determining the position of a mobile station within a cellular telephone system having a plurality of cells, comprising the steps of:

(A) transmitting voice information signals between a first base station transmitter and a mobile station on a transmission channel;

(B) after step (A), ceasing transmissions of said voice information signals on said transmission channel from said first base station transmitter for a predetermined period of time, said first base station transmitter being associated with a first cell;

(C) during said predetermined period of time when said transmissions of voice information signals from said first base station have ceased on said transmission channel, making positional measurements with said mobile station;

(D) after expiration of said predetermined period of time, resuming transmissions of said voice information signals from said first base station transmitter on said transmission channel; and (E) determining said position of said mobile station in accordance with said positional measurements.

10. The method of claim 9, wherein steps (B) through (E) are periodically repeated at a regular interval.

11. The method of claim 9, wherein said mobile station is positioned within a first cell associated with said first base station during step (C), and said step of making said positional measurements includes measuring signal propagation delay times between said mobile station and second and third base stations, wherein said second and third base stations are associated with second and third cells positioned adjacent to said first cell.

12. The method of claim 11, further comprising the step of using a map matching table to estimate said position of said mobile station from said signal propagation delay times.

13. The method of claim 9, wherein step (D) is performed within a switching center in said cellular system.

14. The method of claim 9, wherein step (D) is performed with said first base station.

15. The method of claim 9, wherein said cellular telephone system is a code division multiple access cellular telephone system.

16. The method of claim 9, wherein said cellular telephone system is a time division multiple access cellular telephone system.

17. A method for determining the position of a mobile station within a cellular telephone system having a plurality of cells, comprising the steps of:

(A) transmitting voice information signals between a first base station transmitter and a mobile station on a transmission channel;

(B) after step (A), ceasing transmissions of said voice information signals on said transmission channel from said first base station transmitter for a predetermined period of time, said first base station transmitter being associated with a first cell;

(C) during said predetermined period of time when said transmissions of voice information signals from said first base station have ceased on said transmission channel, making positional measurements with said mobile station;

(D) after expiration of said predetermined period of time, resuming transmissions of said voice information signals from said first base station transmitter on said transmission channel;

(E) determining said position of said mobile station in accordance with said positional measurements; and (F) periodically repeating steps (B) through (E) at a regular interval;

wherein steps (B) through (E) are periodically repeated at said regular interval only when said position of said mobile station cannot be determined from timing measurements made simultaneously with transmission of voice information signals from said base station transmitter.

18. A method for determining the position of a mobile station within a cellular telephone system having a plurality of cells, comprising the steps of:

(A) transmitting voice information signals between a first base station transmitter and a mobile station on a transmission channel;

(B) after step (A), ceasing transmissions of said voice information signals on said transmission channel from said first base station transmitter for a predetermined period of time, said first base station transmitter being associated with a first cell;

(C) during said predetermined period of time when said transmissions of voice information signals from said first base station have ceased on said transmission channel, making positional measurements with said mobile station;

(D) after expiration of said predetermined period of time, resuming transmissions of said voice information signals from said first base station transmitter on said transmission channel;

(E) determining said position of said mobile station in accordance with said positional measurements; and (F) periodically repeating steps (B) through (E) at regular interval;

wherein said predetermined period of time corresponds to at least one frame of voice information in said voice information signals.

19. A method for determining the position of a mobile station within a cellular telephone system having a plurality of cells, comprising the steps of:

(A) transmitting voice information signals between a first base station transmitter and a mobile station on a transmission channel;

(B) after step (A), ceasing transmissions of said voice information signals on said transmission channel from said first base station transmitter for a predetermined period of time, said first base station transmitter being associated with a first cell;

(C) during said predetermined period of time when said transmissions of voice information signals from said first base station have ceased on said transmission channel, making positional measurements with said mobile station;

(D) after expiration of said predetermined period of time, resuming transmissions of said voice information signals from said first base station transmitter on said transmission channel;

(E) determining said position of said mobile station in accordance with said positional measurements; and (F) periodically repeating steps (B) through (E) at a regular interval;

wherein said predetermined period of time corresponds to one frame of voice information in said voice information signals.

20. A method for determining the position of a mobile station within a cellular telephone system having a plurality of cells, comprising the steps of:

(A) transmitting voice information signals between a first base station transmitter and a mobile station on a transmission channel;

(B) after step (A), ceasing transmissions of said voice information signals on said transmission channel from said first base station transmitter for a predetermined period of time, said first base station transmitter being associated with a first cell;

(C) during said predetermined period of time when said transmissions of voice information signals from said first base station have ceased on said transmission channel, making positional measurements with said mobile station;

(D) after expiration of said predetermined period of time, resuming transmissions of said voice information signals from said first base station transmitter on said transmission channel;

(E) determining said position of said mobile station in accordance with said positional measurements; and (F) periodically repeating steps (B) through (E) at a regular interval;

wherein said regular interval corresponds to a period of time from one to three seconds.

21. A method for determining the position of a mobile station within a cellular telephone system having a plurality of cells, comprising the steps of:

(A) transmitting voice information signals between a first base station transmitter and a mobile station on a transmission channel;

(B) after step (A), ceasing transmissions of said voice information signals on said transmission channel from said first base station transmitter for a predetermined period of time, said first base station transmitter being associated with a first cell;

(C) during said predetermined period of time when said transmissions of voice information signals from said first base station have ceased on said transmission channel, making positional measurements with said mobile station;

(D) after expiration of said predetermined period of time, resuming transmissions of said voice information signals from said first base station transmitter on said transmission channel;

(E) determining said position of said mobile station in accordance with said positional measurements; and (F) periodically repeating steps (B) through (E) at a regular interval;

wherein said regular interval corresponds to one out of every 100 frames of voice information in said voice information signals.

22. A method for determining the position of a mobile station within a cellular telephone system having a plurality of cells, comprising the steps of;

(A) transmitting voice information signals between a first base station transmitter and a mobile station on a transmission channel;

(B) after step (A), ceasing transmissions of said voice information signals on said transmission channel from said first base station transmitter for a predetermined period of time, said first base station transmitter being associated with a first cell;

(C) during said predetermined period of time when said transmissions of voice information signals from said first base station have ceased on said transmission channel, making positional measurements with said mobile station;

(D) after expiration of said predetermined period of time, resuming transmissions of said voice information signals from said first base station transmitter on said transmission channel;

(E) determining said position of said mobile station in accordance with said positional measurements; and (F) periodically repeating steps (B) through (E) at a regular interval;

wherein a plurality of mobile stations are in communication with said first base station when said first base station transmitter is transmitting said voice information signals, said method further comprising the step of masking voice information signal errors at said plurality of mobile stations during said predetermined period of time.

* * * * *